US008223833B2

(12) United States Patent
Kadono

(10) Patent No.: US 8,223,833 B2
(45) Date of Patent: Jul. 17, 2012

(54) PICTURE CODING METHOD AND PICTURE DECODING METHOD

(75) Inventor: Shinya Kadono, Nishinomiya (JP)

(73) Assignee: Panasonic Corporation, Osaka (JP)

( * ) Notice: Subject to any disclaimer, the term of this patent is extended or adjusted under 35 U.S.C. 154(b) by 1801 days.

(21) Appl. No.: 10/534,014

(22) PCT Filed: Feb. 19, 2004

(86) PCT No.: PCT/JP2004/001899
§ 371 (c)(1),
(2), (4) Date: May 5, 2005

(87) PCT Pub. No.: WO2004/080083
PCT Pub. Date: Sep. 16, 2004

(65) Prior Publication Data
US 2006/0018377 A1 Jan. 26, 2006

(30) Foreign Application Priority Data
Mar. 3, 2003 (JP) ................................ 2003-056135

(51) Int. Cl.
*H04N 7/12* (2006.01)
(52) U.S. Cl. ................................ 375/240.01; 382/236
(58) Field of Classification Search .............. 375/240.01
See application file for complete search history.

(56) References Cited

U.S. PATENT DOCUMENTS

| 5,899,578 A | 5/1999 | Yanagihara et al. | |
|---|---|---|---|
| 6,181,746 B1 * | 1/2001 | Hoshi | 375/240.25 |
| 6,823,016 B1 * | 11/2004 | Nguyen et al. | 375/240.25 |
| 7,167,591 B2 * | 1/2007 | Kadono et al. | 382/236 |
| 7,218,787 B2 * | 5/2007 | Kadono et al. | 382/236 |
| 7,221,803 B2 | 5/2007 | Kadono et al. | |
| 2001/0027468 A1 | 10/2001 | Okura | |

FOREIGN PATENT DOCUMENTS
JP  9-186968  7/1997
(Continued)

OTHER PUBLICATIONS

Wiegand, T., Study of Final Committee Draft of Joint Video Specificaiton (ITU-T Rec. H.264 ISO/14496-10 AVC), Joint Video Team(JVT) of ISO/IEC MPEG & ITU-T VCEG (ISO/IEC JTC1/SC26/WG11 and ITU-T SC16 Q16), Document JVT-F100, 6$^{th}$ meeting, Awaji Island JP, Dec. 5-13, 2002, whole doument.*

(Continued)

*Primary Examiner* — Jay Au Patel
*Assistant Examiner* — Jessica Prince
(74) *Attorney, Agent, or Firm* — Wenderoth, Lind & Ponack, L.L.P.

(57) ABSTRACT

A picture coding method for preventing occurrence of a malfunction includes: an adding step (Step S203) of coding a memory management command for the first picture of a predetermined picture number and adding the coded command to the second picture that is different from the first picture; and a re-adding step (Steps S205 to S208) of coding the memory management command again and re-adding re-coded command to the section other than the second picture in a coded picture stream VSt. In the re-adding step, re-addition of the memory management command is prohibited when the first picture is not immediately previous in coding order among the pictures of the predetermined picture number included in the coded picture stream VSt.

3 Claims, 16 Drawing Sheets

FOREIGN PATENT DOCUMENTS

| | | |
|---|---|---|
| JP | 2001-258025 | 9/2001 |
| JP | 2003-289544 | 10/2003 |

OTHER PUBLICATIONS

Kadono, S., et al., "Additonal MMCO command for supporting more flexible bitstream switching", Joint Video Team (JVT) of ISO/IEC MPEG& ITU-T VCEG (ISO/IEC JTC1/SC29.WG11 and ITU-T, SG16 Q6), Document JVT-C030, 3$^{rd}$ meeting Fairfax, VA USA May 6-10, 200, p. 1-6.*

Kadona S. et al., "Error robustness memory management control operation", Joint Video Team (JVT) of ISO/IEC MPEG& ITU-T VCEG (ISO/IEC JTC1/SC29/WG11 and ITU-T SC16 Q.6), 4$^{th}$ Meeting: Klagenfurt, Austria Jul. 22-26, 2002.*

Kadona S. et al., "Error robustness memory management control operation", Joint Video Team (JVT) of ISO/IEC MPEG& ITU-T VCEG (ISO/IEC JTC1/SC29/WG11 and ITU-T SC16 Q.6), 4th Meeting: Klagenfurt, Austria Jul. 22-26, 2002.*

Wiegand, T., Study of Final Committee Draft of Joint Video Specificaiton (ITU-T Rec. H.264 ISO/14496-10 AVC), Joint Video Team(JVT) of ISO/IEC MPEG & ITU-T VCEG (ISO/IEC JTC1/SC26/WG11 and ITU-T SC16 Q16), Document JVT-F100, 6th meeting, Awaji Island JP, Dec. 5-13, 2002, whole doument.*

Kadono, S., et al., "Additonal MMCO command for supporting more flexible bitstream switching", Joint Video Team (JVT) of ISO/IEC MPEG& ITU-T VCEG (ISO/IEC JTC1/SC29.WG11 and ITU-T, SG16 Q6), Document JVT-C030, 3rd Meeting Fairfax, VA USA May 6-10, 200, p. 1-6.*

"*Study of Final Committee Draft of Joint Video Specification (ITU-T Rec. H. 264 / ISO/IEC 14496-10 AVC)*", Joint Video Team (JVT) of ISO/IEC MPEC & ITU-T VCEG (ISO/IEC JTC1/SC29/WG11 and ITU-T SG16 Q6), JVT-F100, 6th Meeting: Awaji, Island, JP.Dec. 5-13, 2002, 7.4.3.3. Decoded reference picture marking semantics, "8.2.7.4.1. Marking process of a short-term picture as", unused for reference.

Supplementary European Search Report (in English language) issued Sep. 5, 2007 in European Application No. EP 04 71 2680.

Wiegand, T., "*Study of Final Committee Draft of Joint Video Specification (ITU-T Rec. H.264 $^{\wedge}$ ISO/IEC 14496-10 AVC)*", Joint Video Team (JVT) of ISO/IEC MPEG & ITU-T VCEG (ISO/IEC JTC1/SC29/WG11 and ITU-T SG16 Q6), Document JVT-F100, 6th Meeting, Awaji Island, JP, Dec. 5-13, 2002, [Online] Feb. 16, 2003, pp. 3, 4, 47-49, 53-60, 69-73 and 82 (XP002449480).

Kadono, S., Schlockermann, M., "*Comments on JVT-G050*", Joint Video Team (JVT) of ISO/IEC MPEG & ITU-T VCEG (ISO/IEC JTC1/SC29/WG11 and ITU-T SG16 Q6), Document JVT-H025, 8th Meeting, Geneva, Switzerland, May 23-27, 2003, pp. 1-3 (XP002449481).

Kadono, S., et al., "*Error Robustness Memory Management Control Operation*", Joint Video Team (JVT) of ISO/IEC MPEG & ITU-T VCEG (ISO/IEC JTC1/SC29/WG11 and ITU-T SG16 Q6), Jul. 22, 2002, pp. 1-7 (XP002354616.

Kadono S., et al., "*Additional MMCO command for supporting more flexible bitstream switching*", Joint Video Team (JVT) of ISO/IEC MPEG & ITU-T VCEG (ISO/IEC JTC1/SC29/WG11 and ITU-T SG16 Q6), Document JVT-C030, 3rd Meeting Fairfax, VA, USA, May 6-10, 2002, [Online] May 6, 2002, pp. 1-6 (XP002449482).

Stockhammer, T., "*Error Robust Macroblock Mode and Reference Frame Selection (Document JVT.B102d1.doc)*", Joint Video Team (JVT) of ISO/IEC MPEG & ITU-T VCEG (ISO/IEC JTC1/SC29/WG11 and ITU-T SG16, Jan. 29, 2002, pp. 1-6 (XP002243591).

Office Action issued Oct. 7, 2011 in U.S. Appl. No. 11/976,553.

Thomas Wiegand et al., "H.26L Test Model Long-Term No. 9 (TML-9) draft0", Dec. 21, 2001, ITU—Telecommunications Standardization Sector, Study Group 16, Video Coding Experts Group (VCEG), pp. 1 and 33-40.

* cited by examiner

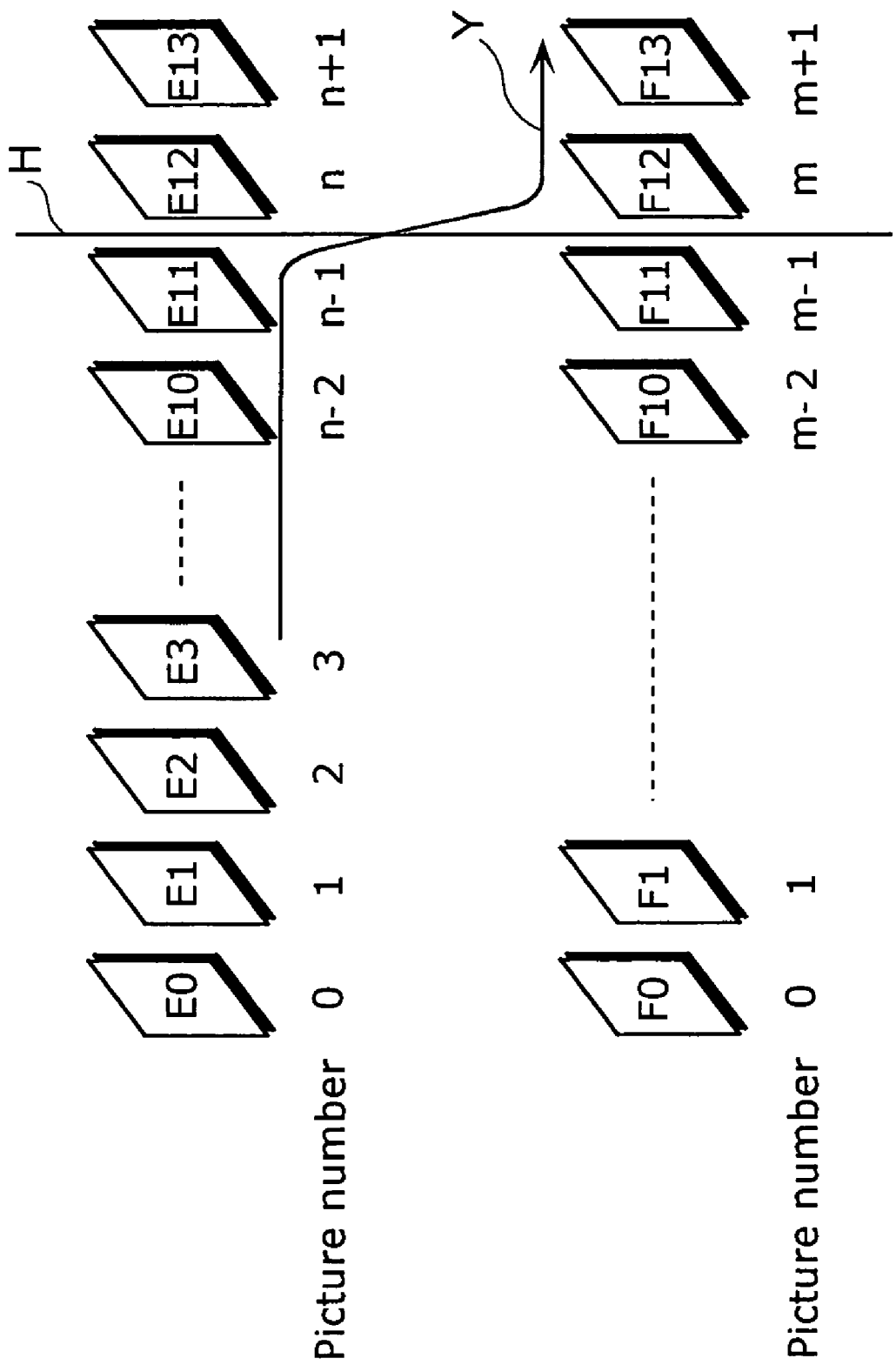

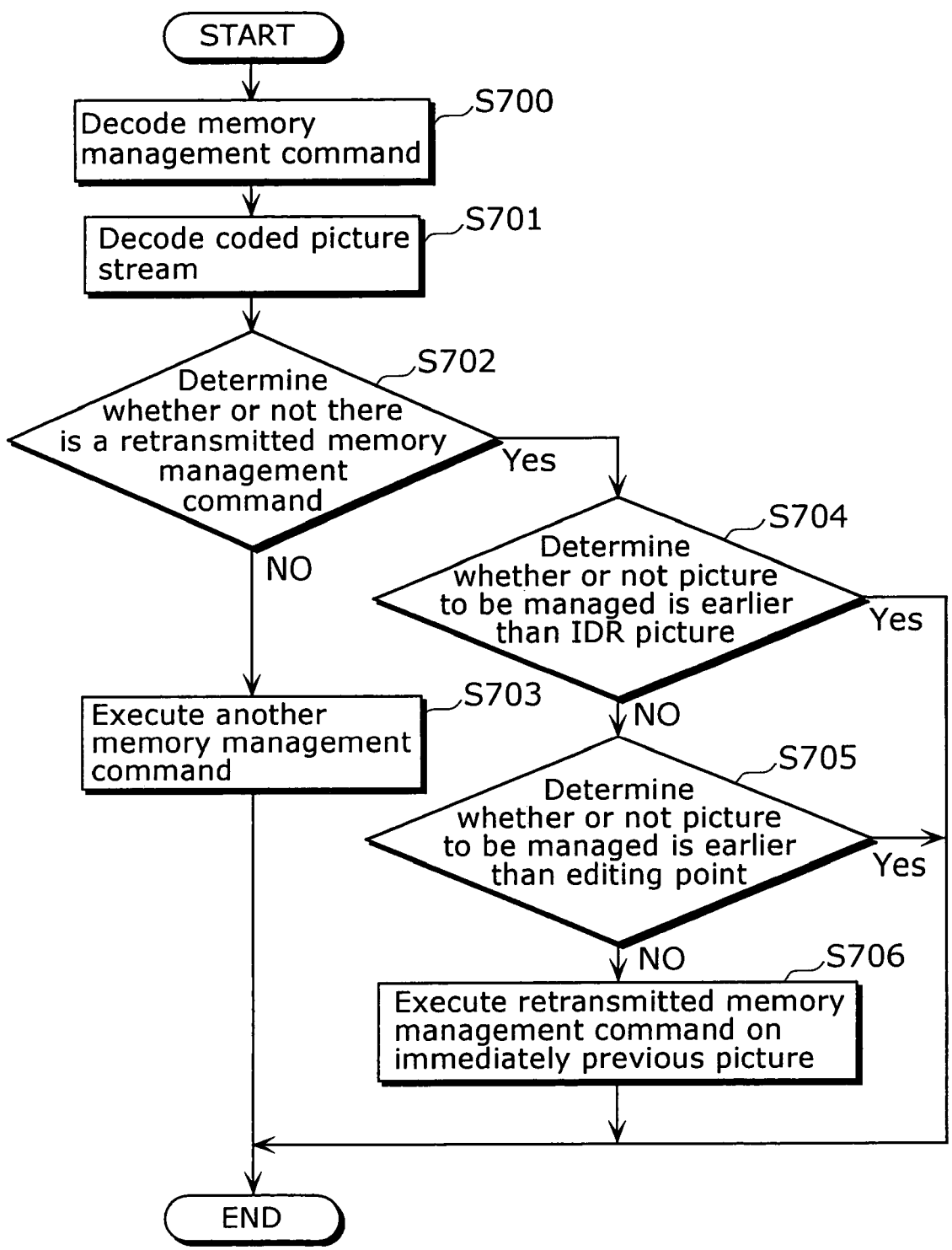

PICTURE CODING METHOD AND PICTURE DECODING METHOD

TECHNICAL FIELD

The present invention relates to a picture coding method for coding moving picture signals on a picture-by-picture basis and a picture decoding method for decoding the coded signals.

BACKGROUND ART

In the age of multimedia which integrally handles audio, video and other pixel values, existing information media, i.e., newspapers, magazines, televisions, radios, telephones and other means through which information is conveyed to people, have recently come to be included in the scope of multimedia. Generally, multimedia refers to something that is represented by associating not only characters but also graphics, voices, and especially pictures and the like together, but in order to include the aforementioned existing information media in the scope of multimedia, it appears as a prerequisite to represent such information in digital form.

However, when calculating the amount of information contained in each of the aforementioned information media as the amount of digital information, while the amount of information per character is 1~2 bytes, the amount of information to be required for voice is 64 Kbits or over per second (telephone quality), and 100 Mbits or over per second for moving pictures (current television reception quality), and thus it is not realistic for the aforementioned information media to handle such an enormous amount of information as it is in digital form. For example, although videophones are already in the actual use via Integrated Services Digital Network (ISDN) which offers a transmission speed of 64 Kbps/s~1.5 Mbps/s, it is not practical to transmit video shot by television cameras directly through ISDN.

Against this backdrop, information compression techniques have become necessary, and moving picture compression techniques compliant with H.261 and H.263 standards suggested by ITU-T (International Telecommunication Union-Telecommunication Standardization Sector) are employed for videophones, for example. Moreover, according to information compression techniques compliant with the MPEG-1 standard, it is possible to store picture information in an ordinary music CD (compact disc) together with sound information.

Here, MPEG (Moving Picture Experts Group) is an international standard on digital compression of moving picture signals, and MPEG-1 is a standard for compressing moving picture signals, namely, television signal information, approximately into one hundredth. Furthermore, since MPEG-1 targets for moderate picture quality which can be realized by a transmission speed of about 1.5 Mbps, MPEG-2, which was standardized with a view to satisfy requirements for further improved picture quality, allows data transmission of moving picture signals at a rate of 2~15 Mbps.

Under the present situation, MPEG-4 that achieves a higher compression ratio than that of MPEG-1 and MPEG-2, has been standardized by the working group (ISO/IEC JTC1/SC29/WG11) which has been engaged in the standardization of MPEG-1 and MPEG-2. A strong error-proof technique has initially been introduced to MPEG-4 for not only allowing efficient coding at a low bit rate but also allowing reduced subjective deterioration of image quality even if a transmission line error occurs. Furthermore, ISO/IEC and ITU-T (Joint Video Team (JVT)) are now jointly making efforts to standardize ITU H.264|AVC as a next-generation picture coding method, and Study of FCD (SoFCD) is the latest standard as of this point in time (See "Study of Final Committee Draft of Joint Video Specification", Joint Video Team (JVT) of ISO/IEC and ITU-T VCEG, JVT-F100, 15 Feb., 2003).

In H.264|AVC, differently from the conventional moving picture coding, it is possible to select an arbitrary picture as a forward reference picture from among a plurality of pictures. Here, a picture indicates a frame or a field.

Reference pictures and the like are stored in a memory.

A memory includes a short-term memory and a long-term memory. A short-term memory stores a plurality of pictures which have been decoded immediately previously, and more specifically, it stores reference pictures such as P pictures (forward predictive coded pictures) and B pictures (bi-predictive coded pictures) in term of MPEG-1 and MPEG-2. A long-term memory is used for storing pictures for a longer time than the short-term memory.

A short-term memory is usually a FIFO (First-In First-Out) memory, and in order to store a new picture into the short-term memory whose storage area is full of pictures, the oldest picture among the pictures which have been stored in the short-term memory is removed from the memory and the new picture is stored in that free area after the removal. Therefore, in the case where it is necessary to refer to, for a long time, the reference picture which is to be removed from the short-term memory, the reference picture is usually moved in advance from the short-term memory to the long-term memory for storage. As a result, it becomes possible to refer to the reference picture for a long time. The long-term memory stores the picture in a specified area. Therefore, the picture stored in that area can be referred to unless the same area is designated and overwritten.

Furthermore, decoded pictures are stored in a display memory temporarily before being displayed. This display memory has a FIFO structure in which the pictures are overwritten in display order from the older one.

Sophisticated memory management is required for using such a memory efficiently, so a mechanism for managing a memory is incorporated into H.264|AVC.

Memory management commands used for the above management are as follows, for example:

1. Command to select pictures which can be referred to;
2. Command to release a memory area of a short-term memory where a picture unnecessary as a reference picture for predictive coding is stored;
3. Command to move the picture stored in the short-term memory to the long-term memory; and
4. Command to release the memory areas for all the pictures and initialize the information concerning picture decoding.

In picture coding and decoding, a signal that indicates the reference picture (reference picture indication signal) is necessary for selecting, on a block-by-block basis, a picture with a smaller prediction error as a reference picture from among the pictures which can be referred to. It is possible to narrow down the number of candidate reference pictures to an appropriate value by selecting in advance the pictures which can be referred to, and thus to save the number of bits of the reference picture indication signal required for each block.

In the case where the picture is moved from the short-term memory to the long-term memory, the picture stored in the short-term memory is removed because it is useless duplication of the same picture which is stored in both the short-term memory and the long-term memory.

In the above picture coding method and picture decoding method, the picture coding apparatus codes the memory management command that instructs removal of an unnecessary picture from a memory and the memory management command that instructs moving of a picture from the short-term memory to the long-term memory, outputs them, and transmits them to the picture decoding apparatus, which decodes them. These memory management commands are added to the coded pictures for transmission. In the case where the picture added with the memory management command is lost due to a transmission error or the like, the ordering of the pictures in the memory cannot be properly reconstructed on the part of the picture decoding apparatus, and thus the pictures cannot be decoded.

In consideration of this problem, it is conceivable to transmit the memory management command (MMCO) again. This retransmission of the memory management command allows proper reconstruction of picture ordering in the memory by the retransmitted memory management command even if the picture added with the memory management command is lost due to a transmission error or the like.

Picture numbers are assigned to respective pictures in order to indicate pictures to which memory management commands are applied and pictures which have been added with memory management commands in the case where the commands are to be retransmitted. These picture numbers indicate the pictures to be managed and the pictures which were initially added with the memory management commands.

Picture numbers are the numbers assigned in ascending order (coding order) in a coded picture stream, and also used for deriving the display order of pictures in the display memory. It should be noted that the picture numbers are coded as remainders of a predetermined number MaxFrameNum because the picture number becomes significantly larger as the number of pictures increases.

On the other hand, an IDR picture is introduced in order to ensure that even if the picture rate or the like of a coded picture stream is switched in the middle of the stream, the subsequent coded picture stream can be properly decoded. This IDR picture is a picture for prohibiting reference to the pictures which are earlier than the IDR picture, and the memory areas for the pictures are released and the information concerning the picture decoding is initialized at the point in time when this IDR picture is coded. Therefore, the pictures stored in the memory after the coding or decoding of the IDR picture are different from the pictures stored before that. Furthermore, an initialization command, instead of the IDR picture, is sometimes used. The IDR picture initializes the decoding information of all the pictures including the picture numbers, while the initialization command initializes only a part of the information (such as the picture numbers).

In addition, in the case where the coded picture stream is edited, namely, in the case where another coded picture stream is newly generated by extracting a part of each of a plurality of coded picture streams and combining them, inconsistency of the picture numbers or the like occurs in the combined point (editing point).

However, there is the following problem in the above picture coding method and picture decoding method: even if the retransmitted memory management command indicates the picture to be managed using the picture number, it is unknown, on the part of the picture decoding apparatus which has received the retransmitted memory management command, to which picture the memory management command is to be applied, and thus a malfunction is induced.

In other words, since the picture numbers are represented as remainders of a predetermined number and the picture numbers are initialized to 0 by the IDR picture and the initialization command, the same picture number is assigned to different pictures. Therefore, it becomes difficult to specify one picture by the picture number and thus the malfunction is induced.

For example, the display memory allocates a new area required for display of respective pictures by removing the pictures in display order from the earlier one based on the information concerning their display order. Once the picture numbers subsequent to the IDR picture or the initialization command are reset to 0, the information indicating the display order is also initialized. As a result, even if the picture coding apparatus retransmits the memory management command for management of the picture earlier than the IDR picture or the like, a malfunction occurs in the picture decoding apparatus which has received the command because there exists no picture to which the memory management command is to be applied.

The present invention is conceived in view of this problem, and the object thereof is to provide the picture coding method and the picture decoding method for preventing occurrence of a malfunction caused by retransmission of a command.

DISCLOSURE OF INVENTION

In order to achieve the above object, the picture coding method of the present invention is a picture coding method for generating a coded picture signal by repeatedly assigning a predetermined set of picture numbers in coding order to respective pictures included in a moving picture signal and coding the pictures on a picture-by-picture basis, the method comprising: an adding step of adding a memory management command to a second picture, the memory management command indicating management of a first picture of a predetermined picture number in a memory, the first picture and the second picture being different from each other; and a re-adding step of re-adding the memory management command to a section other than the second picture in the coded picture signal, wherein the re-adding step includes: a determining substep of determining whether or not the first picture is located immediately previous to the section in coding order, among pictures of the predetermined picture number which are located earlier than the section in the coded picture signal; and a prohibiting substep of prohibiting the re-addition of the memory management command when it is determined in the determining substep that the first picture is not located immediately previous to the section.

Accordingly, the picture to be managed under the retransmitted memory management command is always the immediately previous picture. Therefore, the picture decoding apparatus which has obtained this re-added and retransmitted memory management command can identify the previous picture as a picture to be managed under that memory management command even if there are a plurality of pictures of the predetermined picture number indicated by the memory management command, and thus can prevent occurrence of a malfunction caused by the retransmitted memory management command on the part of the picture decoding apparatus.

Here, in the determining substep, it may be determined whether or not the first picture is located earlier than a reference point in the coded picture signal in coding order, and in the prohibiting substep, the re-addition of the memory management command may be prohibited when it is determined in the determining substep that the first picture is located earlier than the reference point. For example, in the determining substep, an editing point is handled as the reference point, the editing point being a point at which continuity of the coded picture signal is lost by editing. Or, in the determining substep, a coded picture including information that prompts initialization of the memory is handled as the reference point.

Accordingly, the memory management command for management of the picture which is located earlier than the reference point is not retransmitted. Therefore, the picture decoding apparatus which has obtained this re-added and retransmitted memory management command can handle the picture which is located later than the reference point as a picture to be managed under the memory management command, and thus can prevent occurrence of a malfunction caused by applying the memory management command to, for example, the picture which is located earlier than the reference point and has already been deleted.

Furthermore, in order to achieve the above object, the picture decoding method of the present invention is a picture decoding method for decoding a coded picture signal obtained by coding a moving picture signal on a picture-by-picture basis, using a predetermined set of picture numbers which are repeatedly assigned to respective pictures in decoding order, the method comprising: a determining step of determining whether or not a memory management command is added to the coded picture signal, the memory management command indicating management of a picture of a predetermined picture number in a memory; a selecting step of selecting a picture which is located immediately previous to the memory management command in decoding order from among pictures of the predetermined picture number which are located earlier than the memory management command in the coded picture signal, when it is determined in the determining step that the memory management command is added; and an executing step of executing the management indicated by the memory management command on the picture selected in the selecting step.

Accordingly, the memory management command is applied to the immediately previous picture even if there are a plurality of pictures of the predetermined picture number indicated by the memory management command. Therefore, it becomes possible to handle the same picture as a picture to be managed on both parts of the picture coding apparatus and the picture decoding apparatus by having the picture coding apparatus retransmit the memory management command for management of the immediately previous picture, and thus prevent occurrence of a malfunction caused by the memory management command retransmitted from the picture coding apparatus.

It should be noted that the present invention can be realized not only as the above-mentioned picture coding method and picture decoding method, but also as a picture coding apparatus and a picture decoding apparatus that use these methods, as a recording medium on which a coded picture stream obtained by the coding by the picture coding method, or as a program that causes a computer to execute each of the steps in the picture coding method and the picture decoding method. And needless to say, such a program can be distributed via a recording medium such as a CD-ROM and a transmission medium such as the Internet.

BRIEF DESCRIPTION OF DRAWINGS

FIG. 3 is a diagram showing respective pictures used for explaining editing of streams in the first embodiment of the present invention.

FIG. 11 is a flowchart showing the operation of the picture decoding apparatus in the second embodiment of the present invention for handling a memory management command based on an IDR picture, an editing point and a judgment about whether a picture is the immediately previous one or not.

BEST MODE FOR CARRYING OUT THE INVENTION

The embodiments of the present invention will be described below using the diagrams.

First Embodiment

Figure 1:
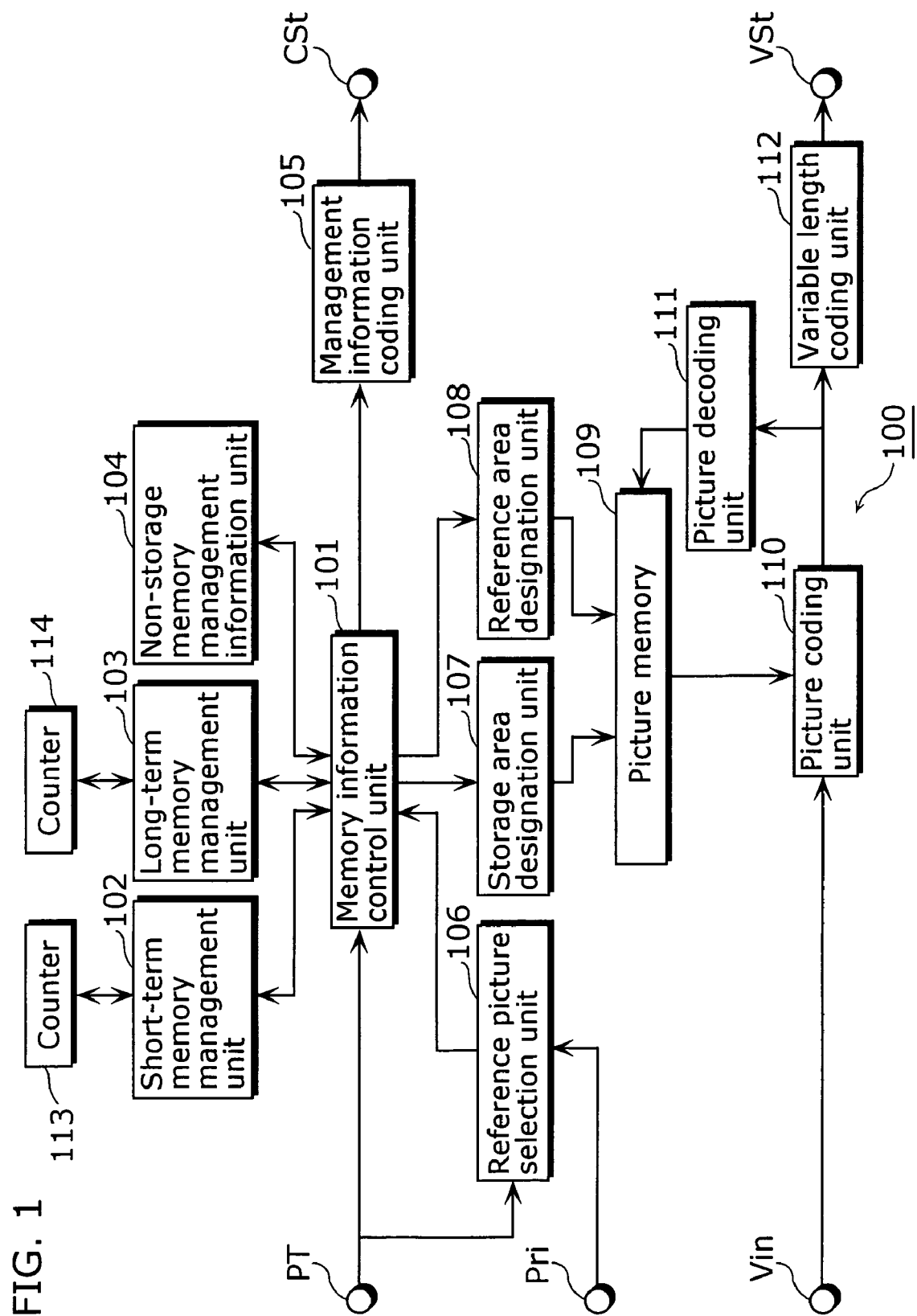
FIG. 1 is a block diagram showing a configuration of a picture coding apparatus for realizing a picture coding method according to a first embodiment of the present invention.

FIG. 1 is a block diagram showing a configuration of a picture coding apparatus for realizing a picture coding method according to the present embodiment.

A picture coding apparatus 100 includes a memory information control unit 101, a short-term memory management unit 102, a long-term memory management unit 103, a non-storage memory management information unit 104, a management information coding unit 105, a reference picture selection unit 106, a storage area designation unit 107, a reference area designation unit 108, a picture memory 109, a picture decoding unit 111, a picture coding unit 110, a variable length coding unit 112, a counter 113, a counter 114 and others.

The reference picture selection unit 106 selects candidate reference pictures based on a priority indication signal Pri and picture type information PT which are inputted from outside, and notifies the memory information control unit 101 of the selection result.

The memory information control unit 101 judges, based on the picture type information PT, whether either a forward or backward picture can be referred to or both forward and backward pictures can be referred to. Furthermore, the memory information control unit 101 instructs the reference area designation unit 108 to output the reference picture(s) that corresponds to the judgment result from the picture memory 109 to the picture coding unit 110.

The picture coding unit 110 codes an input picture signal Vin on a picture-by-picture basis with reference to the reference picture outputted from the picture memory 109. The variable length coding unit 112 further performs variable length coding on the output from the picture coding unit 110 and outputs a coded picture stream VSt. In the case where the coded picture stream VSt is edited, the variable length coding unit 112 also codes the information indicating the editing point of the edited coded picture stream VSt. The output from the picture coding unit 110 is decoded by the picture decoding unit 111 so as to be a decoded picture, and stored in the picture memory 109 as a reference picture.

In this regard, a memory area of the picture memory 109 where the decoded picture can be stored is determined according to the instruction from the storage area designation unit 107. More specifically, the memory information control unit 101 inquires the short-term memory management unit 102 about the memory area of the short-term memory in the picture memory 109 from which a picture is removed, so as to designate it. The storage area designation unit 107 instructs the picture memory 109 to record the decoded picture in the designated memory area.

The short-term memory management unit 102 detects an unnecessary picture (which is not referred to) in the short-term memory, and notifies the memory information control unit 101 of the memory management command that instructs removal (release of the memory area) of the unnecessary picture as a picture to be managed. The long-term memory management unit 103 notifies the memory information control unit 101 of the memory management command that instructs moving of the picture in the short-term memory as a picture to be managed to the long-term memory in the picture memory 109. These memory management commands are coded by the management information coding unit 105 so as to be a memory management information stream CSt. The memory management commands included in this memory management information stream CSt are added to the coded picture stream VSt and transmitted to the picture decoding apparatus.

The counter 113 for the short-term memory and the counter 114 for the long-term memory count the number of codings of the memory management command that instructs removal of an unnecessary picture and the memory management command that instructs moving of the picture in the short-term memory to the long-term memory.

The non-storage memory management information unit 104 manages whether or not the memory management command that instructs removal of an unnecessary picture and the memory management command that instructs moving of the picture in the short-term memory to the long-term memory have been coded and added to the picture in the coded picture stream VSt which is difficult to be decoded and less important. In the case where these memory management commands have been added to the less important picture, the non-storage memory management information unit 104 instructs the memory information control unit 101 to code the memory management commands again and add them to the coded picture stream VSt.

As a result, the picture coding apparatus 100 transmits the above memory management commands multiple number of times when necessary, and thus prevents the memory management commands in the memory management information stream CSt from being lost due to a transmission line error.

Furthermore, at the time of the second or the subsequent transmission (retransmission) of the memory management command, the memory information control unit 101 detects whether or not the picture which is stored in the memory and to which the memory management command is to be applied (the picture to be managed) has been coded earlier than the IDR picture, and does not code the memory management command for retransmission if the picture has been coded earlier than the IDR picture. Also, the memory information control unit 101 detects whether or not the picture to be managed is the immediately previous picture in coding order among the pictures assigned the same picture number (because the repeated number is assigned), and codes the memory management command for retransmission only if the picture is the immediately previous one. Furthermore, the memory information control unit 101 detects whether or not the picture to be managed is earlier in coding order than the editing point in the coded picture stream VSt at which the pictures are discontiguous due to editing, and does not code the memory management command for retransmission if the picture to be managed is earlier than the editing point.

Here, the features of the present embodiment will be described.

Figure 2A:
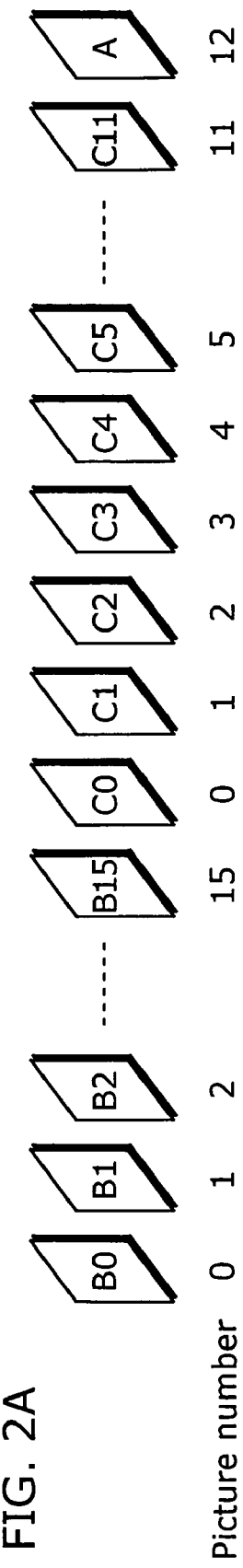
FIG. 2A and FIG. 2B are diagrams showing respective pictures used for explaining the first embodiment of the present invention.

FIG. 2A is a diagram showing respective coded pictures.

As shown in this FIG. 2A, picture numbers are assigned to respective pictures in coding order. The picture number goes back to 0 again when it comes to the predetermined maximum number (15, for example). The picture numbers repeat themselves as just described.

It is assumed that a picture to be coded at the current time (a current picture to be coded) is a picture A. In the present embodiment, the case where a memory management command (MMCO) attached to a picture which has been coded earlier than the picture A is coded again and added to the point of the picture A is described as follows.

It is assumed that respective pictures which have been coded earlier than the picture A are pictures B0, B1 . . . B15, C0, C1 . . . C11. The picture numbers for the pictures B0 to B15 are 0 to 15, while the picture numbers for the pictures C0 to C11 are 0 to 11. The coding order of the pictures C0, C1 . . . C11 which are assigned the repeated picture numbers is closer to the picture A than that of the pictures B0, B1 . . . B15 although they are assigned the repeated picture numbers in the same manner. Therefore, the picture coding apparatus 100 in the present embodiment codes again the memory management command to be applied to the pictures C0, C1 . . . C11, and adds it at the point of the picture A for transmission, but does not code again the memory management command to be applied to the pictures B0, B1 . . . B15.

For example, even in the case where a memory management command indicating that the memory where the picture B2 assigned the picture number 2 is stored is to be released (so as to be reusable) has been coded previously, the picture coding apparatus 100 in the present embodiment does not code the memory management command again at the point of the picture A. Instead, in the case where a memory management command indicating that the memory area where the picture C2 assigned the picture number 2 is stored is to be released has been coded previously, it codes the memory management command again at the point of the picture A (re-adds the command to the picture A).

By doing so, when decoding a memory management command that instructs release of a memory area, the picture decoding apparatus can determine uniquely which memory should be released, the memory where the picture B2 of the picture number 2 is stored or the memory where the picture C2 of the same picture number 2 is stored. In other words, the picture decoding apparatus can designate the memory area where the picture C2, which has been coded at the closest time to the current picture A, is stored, as a memory area to be released. As a result, there is no occurrence of inconsistency of memory status between the picture coding apparatus and the picture decoding apparatus, and thus it is possible to prevent occurrence of malfunctions in the picture decoding apparatus caused by retransmission of a memory management command.

Another feature of the present embodiment will be explained.

Figure 2B:
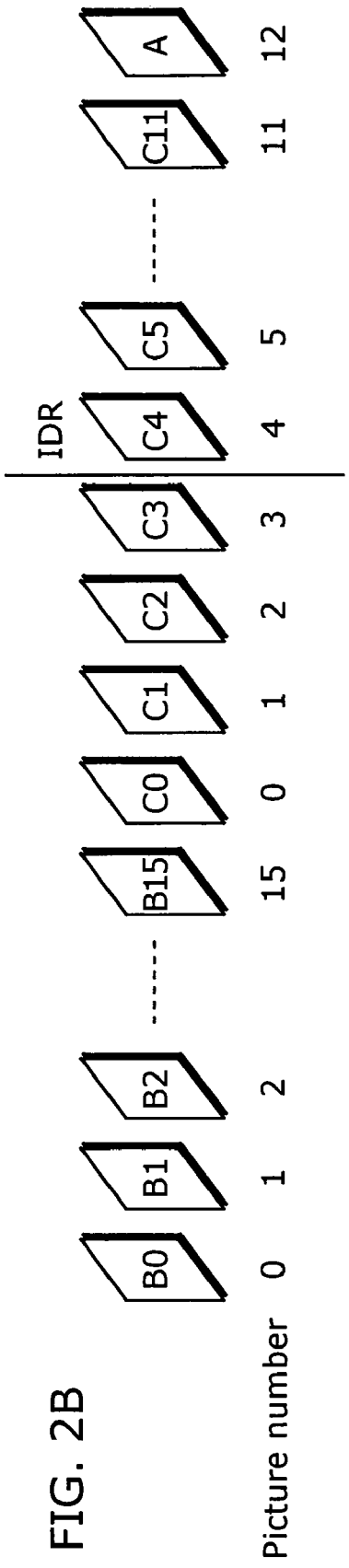

FIG. 2B is a diagram showing respective pictures in the case where the picture C4 in FIG. 2A is an IDR picture.

An IDR picture is a picture introduced for ensuring that a coded picture stream VSt can be properly decoded even if the decoding of the coded picture stream VSt is started at the point of the IDR picture, or the stream subsequent to the IDR picture can be properly decoded even if the picture rate of the coded picture stream VSt is switched just before the IDR picture. This IDR picture prohibits reference to the pictures earlier than the IDR picture, and the memory areas in the memory for all the pictures are released is and the information concerning the decoding thereof is initialized at the point in time when this IDR picture is coded.

The present embodiment is configured so that, in the case where a memory management command (MMCO) attached to the picture which has been coded earlier than the picture A which is to be currently coded is coded again and added at the point of the picture A, the memory management command to be applied to the picture is not coded again if the picture has been coded earlier than the IDR picture.

For example, in the case where the memory management command indicating that the memory where the picture C1, which is earlier than the picture C4 that is an IDR picture, is stored is to be released (so as to be reusable) has been previously coded, the picture coding apparatus 100 in the present embodiment does not code that memory management command again.

The IDR picture initializes the pictures stored in the memory at this point in time and their picture numbers. Therefore, in the case where a picture to be managed under a memory management command to be retransmitted is earlier than the IDR picture, there has already been no such picture to be managed under the memory management command in the memory of the picture decoding apparatus at the point in time when the memory management command is retransmitted. In such a situation, a malfunction may occur in the picture decoding apparatus, such as newly generating the picture which has been lost and storing it into the memory by regarding the situation as an error, and as a result, losing another picture in the memory.

Therefore, the picture coding apparatus 100 in the present embodiment can prevent occurrence of such a malfunction by not coding again the memory management command which is to be applied to the picture which has been coded earlier than the IDR picture.

Still another feature of the present embodiment will be explained using FIG. 3.

FIG. 3 is a diagram for explaining editing of coded picture streams VSt.

For example, as shown in FIG. 3, a coded picture stream including pictures E0 to E13 and a coded picture stream including pictures F0 to F13 are combined with each other (edited) in the middle of the respective streams. It should be noted that coded picture streams are edited in this manner for editing pictures recorded on a DVD or the like.

The coded picture stream including the pictures E0 to E13 is separated between the picture E11 and the picture E12, while the coded picture stream including the pictures F0 to F13 is separated between the picture F11 and the picture F12. The coded picture stream including the pictures E0 to E11 and the coded picture stream including the pictures F12 and F13 are combined so as to be edited as a single coded picture stream Y. The point at which the picture numbers are discontiguous as a result of combining two streams at the point between the picture E11 and the picture F12 is called an editing point H.

In order to code again the memory management command (MMCO) attached to the picture which has been coded earlier than the current picture to be coded, namely, the picture F13, so as to attach it to the picture F13, the picture coding apparatus 100 in the present embodiment determines whether or not the picture to be managed under the memory management command is a picture which has been coded earlier than the editing point H. If it is the picture which has been coded earlier than the editing point H, the picture coding apparatus 100 prohibits the re-coding of the memory management command.

For example, in the case where the memory management command indicating that the memory where the picture F1 that is earlier than the editing point H is stored is to be released (so as to be reusable) has been previously coded together with the picture F10 of the picture number m-2, the picture coding apparatus 100 does not code the memory management command again.

More specifically, since the coded picture stream including the picture F13 is now the coded picture stream Y after editing, the pictures F0 to F11 which are earlier than the editing point H are not stored in the memory. So, once the memory management command which is applied to any of the pictures F0 to F11 that are the pictures earlier than the editing point H is coded again, the picture decoding apparatus may perform a malfunction of newly generating the lost picture and storing it into the memory and deleting another picture because the picture to which the memory management command is to be applied has been lost when executing the memory management command. Therefore, the picture coding apparatus 100 in the present embodiment prohibits re-coding of such a memory management command.

Here, the operation of the picture coding apparatus 100 in the present embodiment will be explained.

Figure 4:
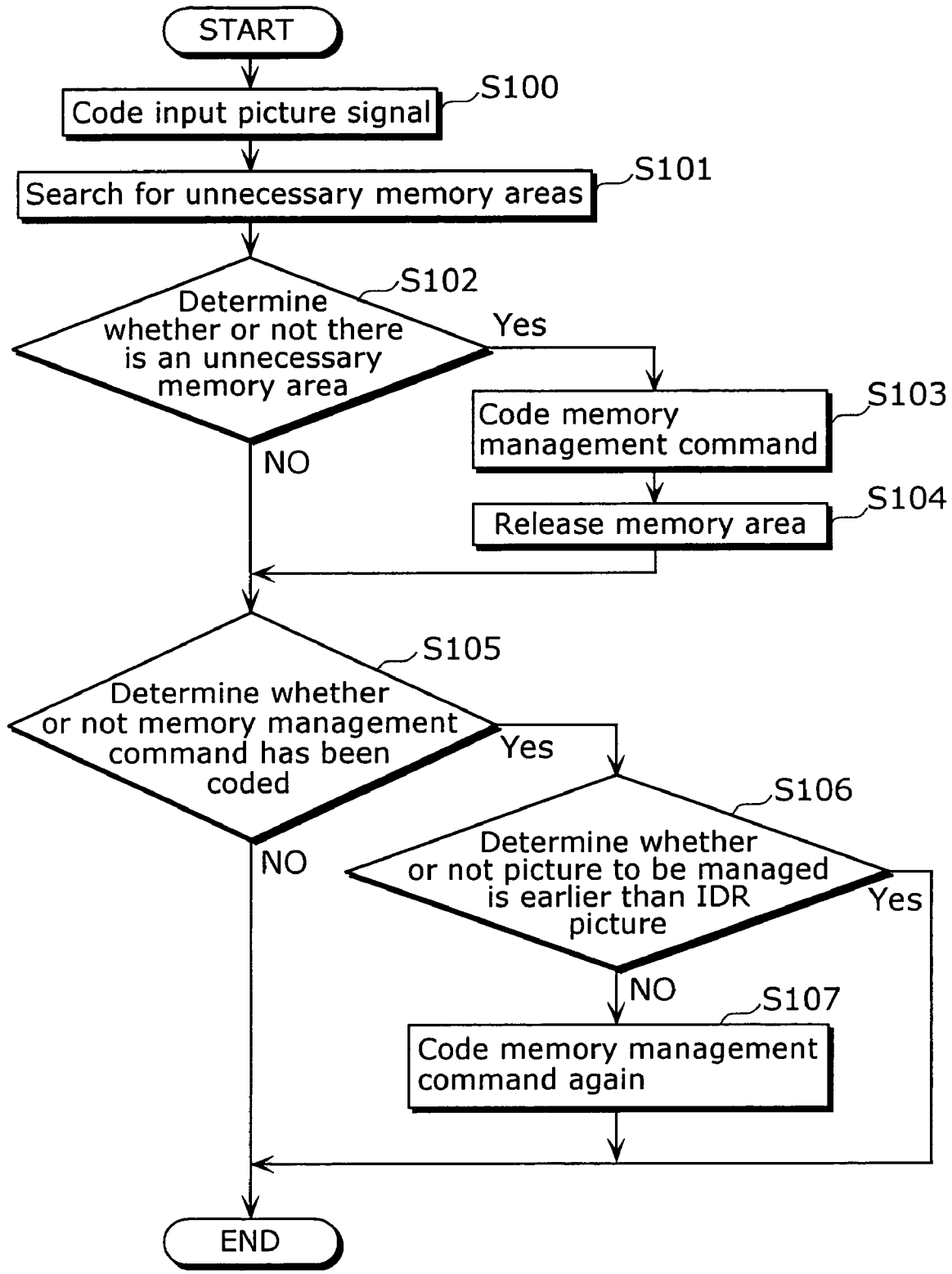
FIG. 4 is a flowchart showing the operation of the picture coding apparatus in the first embodiment of the present invention for coding a memory management command again based on an IDR picture.

FIG. 4 is a flowchart showing the operation of the picture coding apparatus 100 in the present embodiment for coding a memory management command again based on an IDR picture.

First, the picture coding unit 110 in the picture coding apparatus 100 starts coding the input picture signal Vin (Step S100). The short-term memory management unit 102 and the long-term memory management unit 103 search for unnecessary areas in the memory (pictures which are not to be referred to for future coding) during the coding processing by the picture coding unit 110 (Step S101), and determine whether there is unnecessary memory areas or not. Here, when the short-term memory management unit 102 and the long-term memory management unit 103 determine that there is unnecessary memory areas (Yes in Step S102), the management information coding unit 105 in the picture coding apparatus 100 codes the memory management command that instructs release of the unnecessary memory areas (Step S103). Then, the short-term memory management unit 102 and the long-term memory management unit 103 release the unnecessary areas (Step S104). When the short-term memory management unit 102 and the long-term memory management unit 103 determine that there is no unnecessary memory area (No in Step S102), the picture coding apparatus 100 does not execute the operations of Steps S103 and S104.

Next, the memory information control unit 101 determines, based on the operation of the non-storage memory management information unit 104, whether or not the memory management command that instructs release of an unnecessary memory area has been coded and added to a previously coded picture (a picture earlier than the current picture to be coded) (Step S105), and when it determines that the memory management command has not yet been coded (No in Step S105), the picture coding apparatus 100 ends the processing.

On the other hand, when it determines that the memory management command has been coded (Yes in Step S105), the memory information control unit 101 determines whether or not the picture to be managed under the memory management command (the picture which has been stored in the released unnecessary memory area) is earlier than the IDR picture in coding order (Step S106). Here, when determining that the picture to be managed is earlier than the IDR picture (Yes in Step S106), the memory information control unit 101 ends the processing without coding (adding) the memory management command again. When determining that the picture to be managed is not earlier than the IDR picture (No in Step S106), the memory information control unit 101 codes (adds) the memory management command again (Step S107), and then ends the processing.

Figure 5:
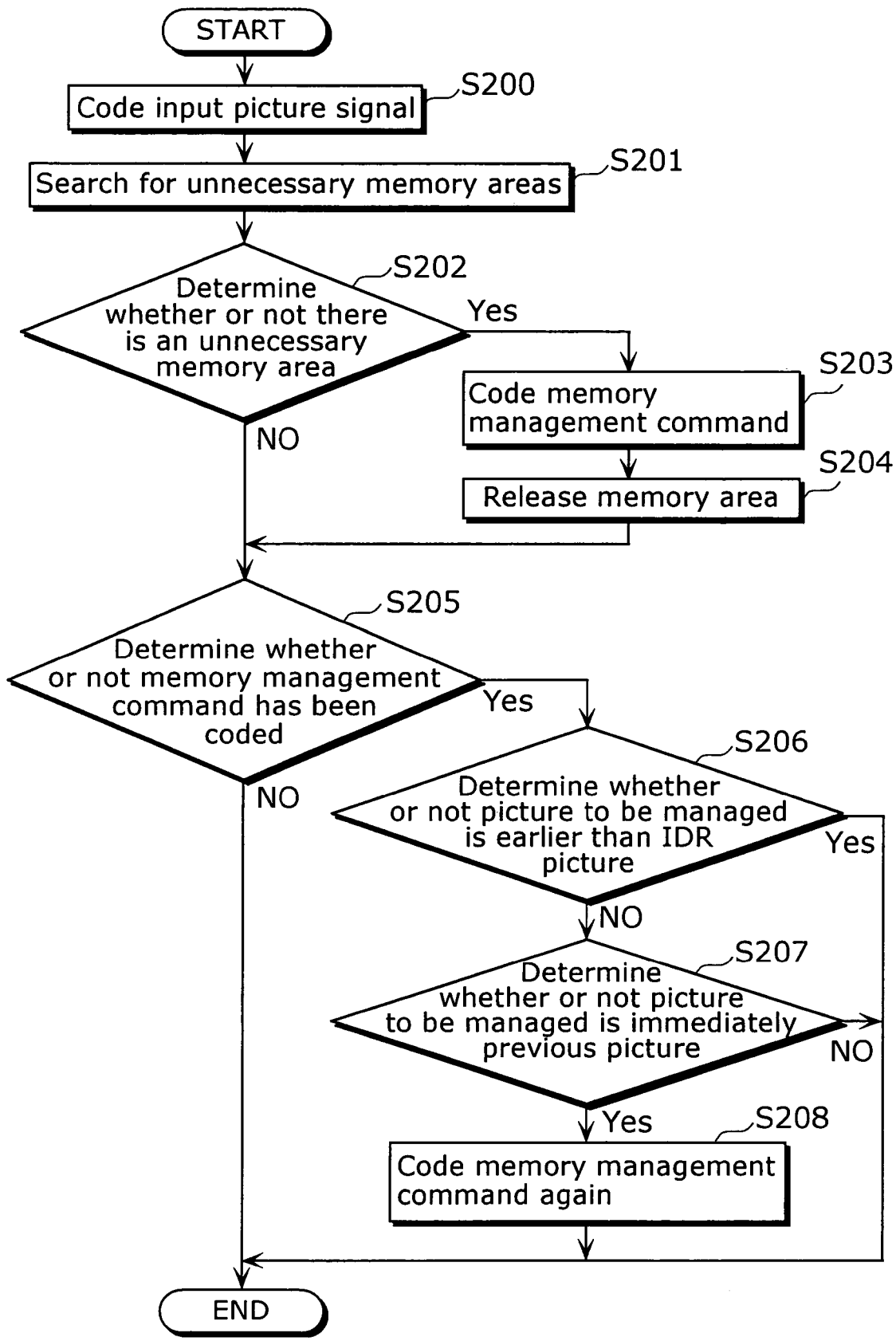
FIG. 5 is a flowchart showing the operation of the picture coding apparatus in the first embodiment of the present invention for coding a memory management command again based on an IDR picture and a judgment about whether a picture is the immediately previous one or not.

FIG. 5 is a flowchart showing the operation of the picture coding apparatus 100 in the present embodiment for coding a memory management command again based on an IDR picture and a judgment about whether a picture is the immediately previous one or not.

The picture coding apparatus 100 first executes the same operations (S200 to S206) as Steps S100 to S106 as shown in FIG. 4.

When determining that the picture to be managed under the memory management command is not earlier than the IDR picture (No in Step S206), the memory information control unit 101 further determines whether or not the picture to be managed is the immediately previous picture among the pictures assigned the picture number same as that of the picture to be managed (Step S207). More specifically, the memory information control unit 101 determines whether or not the picture to be managed, among the pictures assigned the picture number same as that of the picture to be managed, is immediately previous to, in coding order, the point of the coded picture stream VSt at which the memory management command is to be added again.

As a result, when determining that the picture is not the immediately previous one (No in Step S207), the memory information control unit 101 ends the processing without coding the memory management command again. When determining that the picture is the immediately previous one (Yes in Step S207), the memory information control unit 101 codes the memory management command again (Step S208) and ends the processing.

Figure 6:
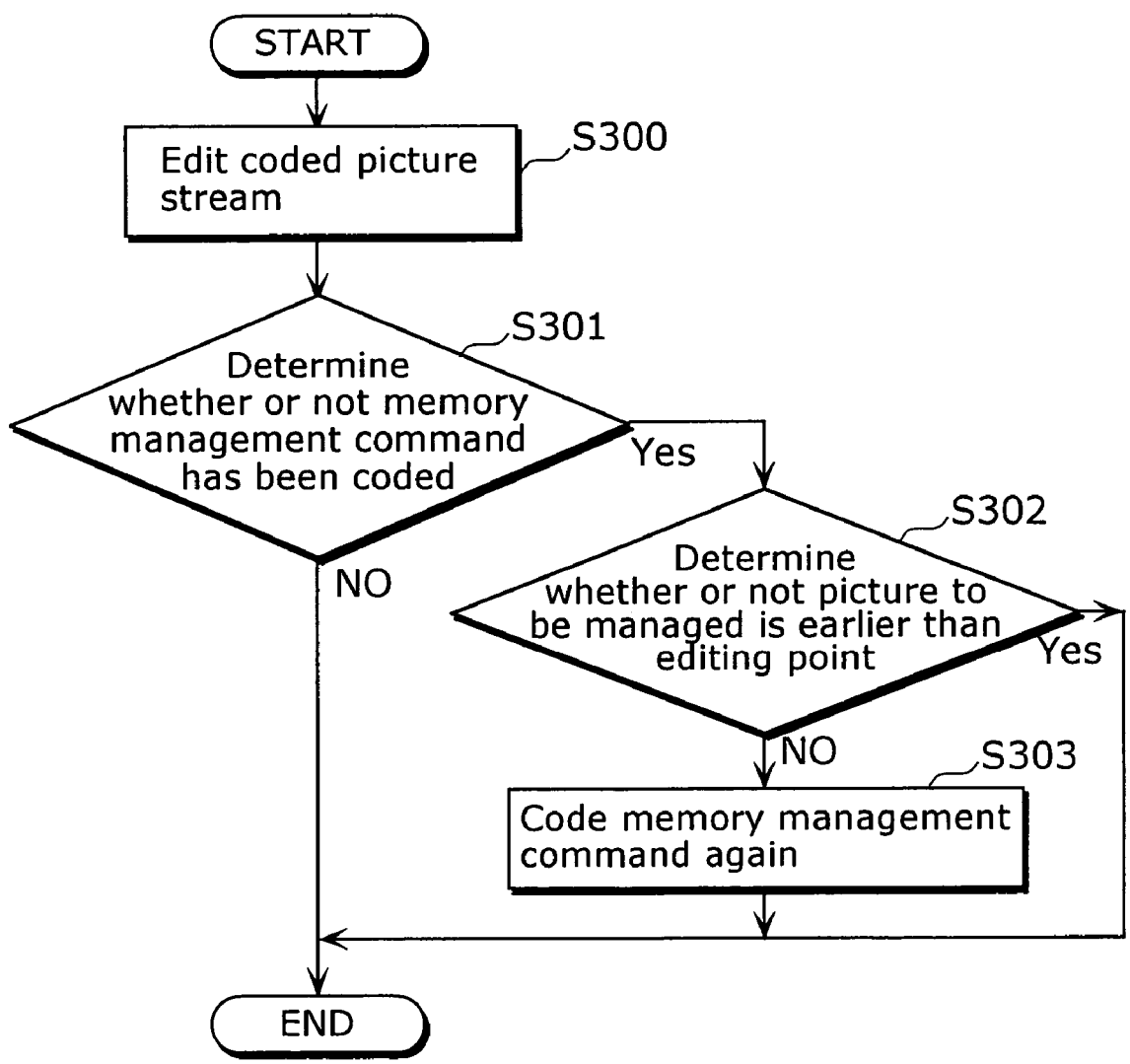
FIG. 6 is a flowchart showing the operation of the picture coding apparatus in the first embodiment of the present invention for editing a coded picture signal.

FIG. 6 is a flowchart showing the operation of the picture coding apparatus 100 in the present embodiment for editing a coded picture signal.

First, the picture coding apparatus 100 edits the coded picture stream VSt (Step S300).

Next, the memory information control unit 101 of the picture coding apparatus 100 determines whether or not the memory management command has been coded and added to the edited coded picture stream VSt (Step S301).

Here, when determining that the memory management command has been coded (Yes in Step S301), the picture coding apparatus 100 further determines whether or not the picture to be managed under the memory management command is earlier than the editing point in coding order (Step S302).

On the other hand, when determining that the memory management command has not yet been coded in Step S301 (No in Step S301) or when determining that the picture to be managed is earlier than the editing point in Step S302 (Yes in Step S302), the picture coding apparatus 100 ends the processing for editing the coded picture stream VSt.

Furthermore, when determining that the picture to be managed is not earlier than the editing point in Step S302 (No in Step S302), the memory information control unit 101 in the picture coding apparatus 100 causes the management information coding unit 105 to code the memory management command again and add it to the coded picture stream VSt again (Step S303).

Figure 7:
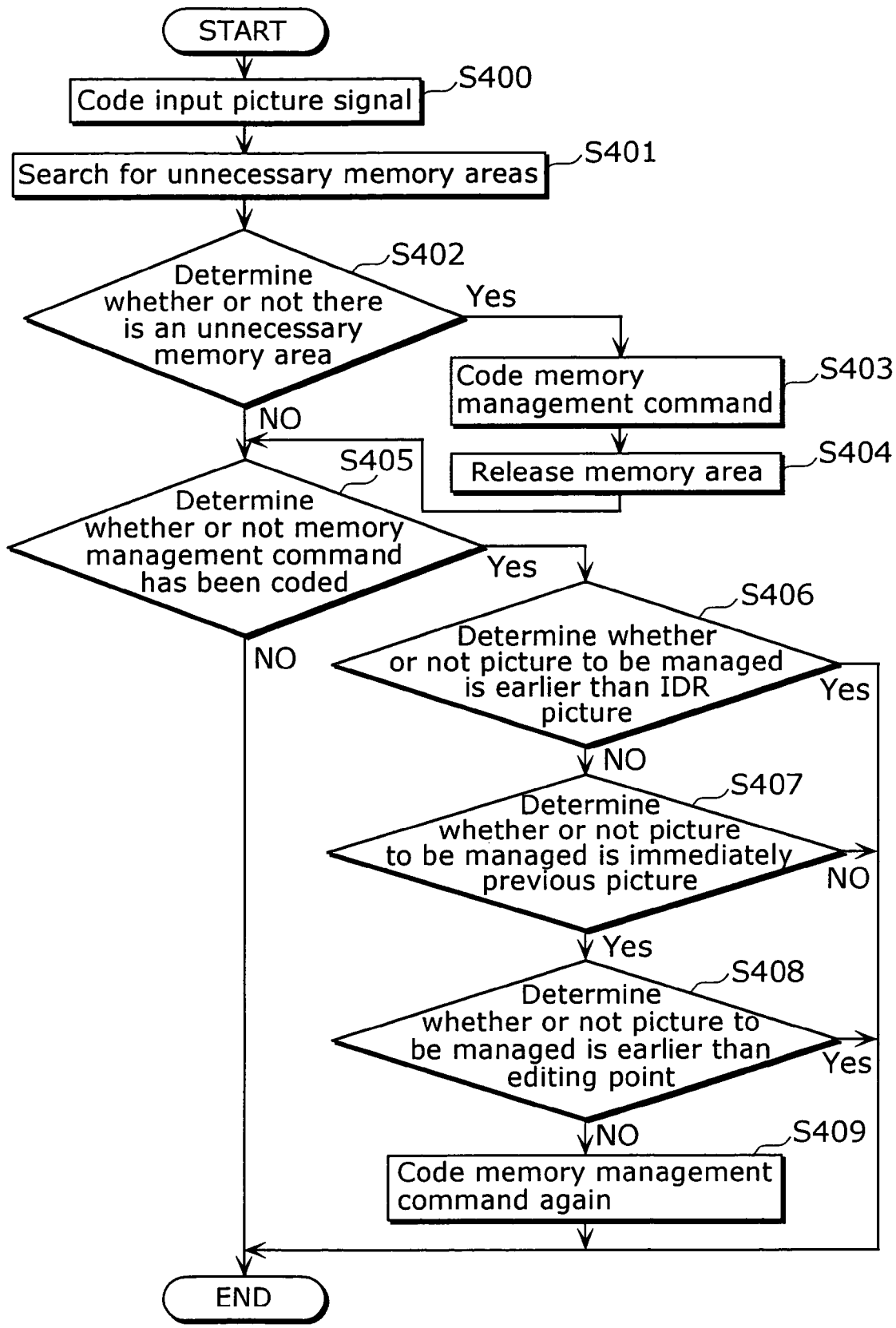
FIG. 7 is a flowchart showing the operation of the picture coding apparatus in the first embodiment of the present invention for coding a memory management command again based on an IDR picture, a judgment about whether a picture is the immediately previous one or not, and an editing point.

FIG. 7 is a flowchart showing the operation of the picture coding apparatus 100 in the present embodiment for coding a memory management command again based on an IDR picture, a judgment about whether a picture is the immediately previous one or not, and an editing point.

The picture coding apparatus 100 first executes the same operations (Steps S400 to S407) as Steps S200 to S207 as shown in FIG. 5.

When determining that the picture to be managed under the memory management command is not the immediately previous picture (No in Step S407), the memory information control unit 101 ends the processing. When determining that the picture to be managed is the immediately previous one (Yes in Step S407), the memory information control unit 101 further determines whether or not the picture to be managed under the memory management command is earlier than the editing point in coding order (Step S408).

When determining that the picture is earlier than the editing point (Yes in Step S408), the memory information control unit 101 ends the processing. When determining that the picture is not earlier than the editing point (No in Step S408), the memory information control unit 101 codes (adds) the memory management command again (Step S409), and ends the processing.

As described above, in the present embodiment, the memory management command that instructs release of a memory area (to remove the picture stored in that memory area) is coded repeatedly. Therefore, even if one memory management command is lost due to a transmission line error, another memory management command delivers the instruction of the lost command to the picture decoding apparatus, and thus the picture decoding apparatus can decode the picture properly in spite of the transmission line error.

Furthermore, the picture coding apparatus 100 in the present embodiment does not code the memory management command again in the case where the picture to be managed under the memory management command is earlier than the editing point, earlier than the IDR picture, or not the immediately previous picture. Therefore, it is possible to prevent the malfunctions in the picture decoding apparatus caused by the reasons that there exists no picture to be managed under the memory management command when the memory management command is executed and the like.

It should be noted that although the present embodiment is described taking the memory management command that instructs release of an unnecessary memory area as an example, it may be another memory management command that instructs moving of a picture stored in the short-term memory to the long-term memory if only it indicates how to manage the picture in the memory.

In addition, although, in the present embodiment, it is prohibited to retransmit the memory management command when the picture to be managed under the memory management command is earlier than the IDR picture in coding order, the retransmission may be prohibited when the picture to be managed is earlier than the memory initialization command in coding order. This memory initialization command is a command that instructs initialization of a memory by deleting all the pictures stored in the memory and resetting of the picture number to 0.

Furthermore, although the flowchart in FIG. 7 is explained on the assumption that the picture coding apparatus 100 executes all the Steps S406, S407 and S408 in this order, these steps may be executed in no particular order, namely, the execution order of the steps may be changed, or a part of the steps may be omitted for simple realization.

Furthermore, although the flowcharts in FIG. 4 to FIG. 7 show the example where the memory management command not to be retransmitted is coded prior to the memory management command to be retransmitted, they may be coded the other way around, namely, the memory management command not to be retransmitted may be coded after coding the memory management command to be retransmitted.

Second Embodiment

Next, the second embodiment of the present invention will be described.

Figure 8:
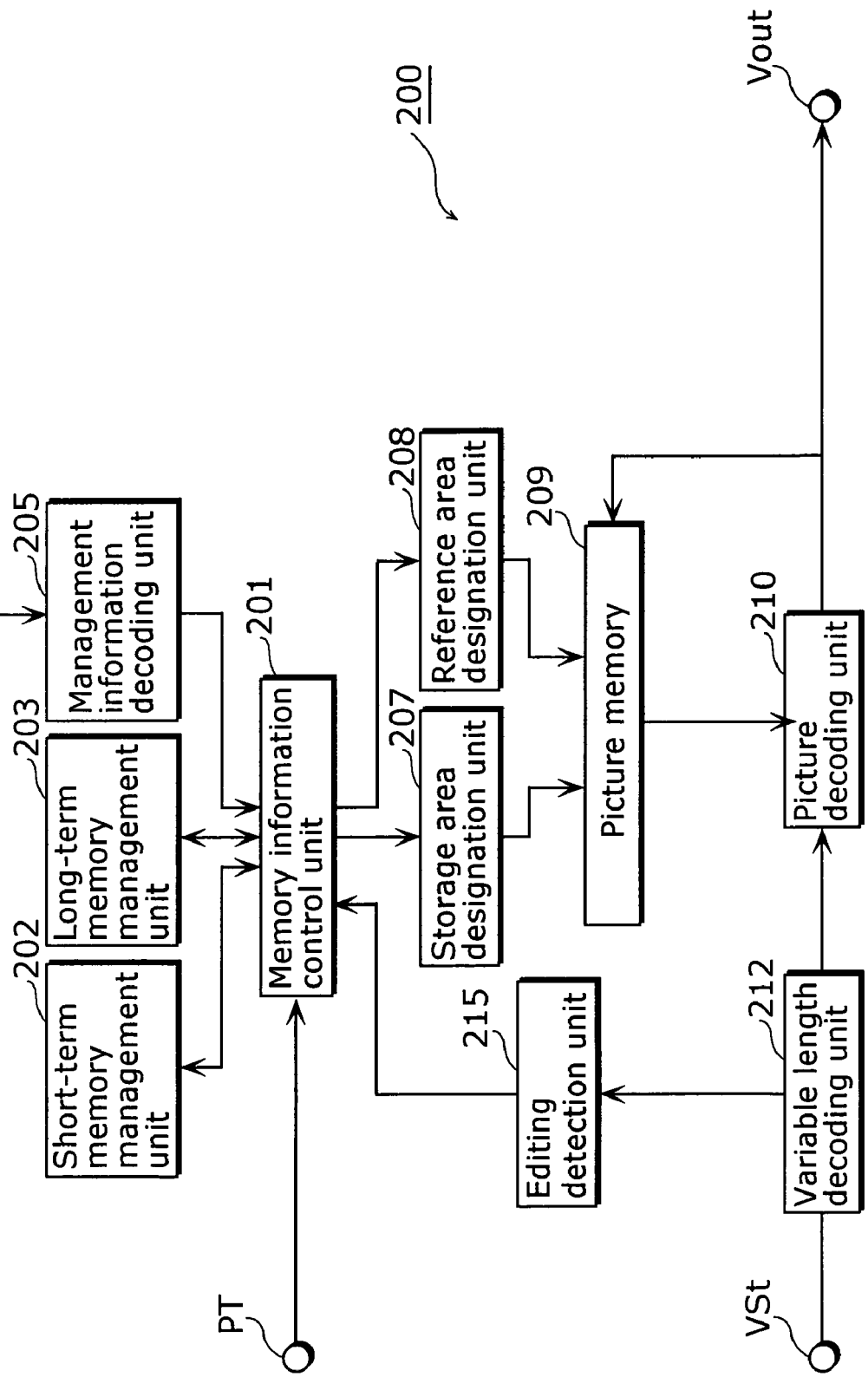
FIG. 8 is a block diagram showing a configuration of a picture decoding apparatus for realizing a picture decoding method in a second embodiment of the present invention.

FIG. 8 is a block diagram showing a picture decoding apparatus for realizing a picture decoding method in the second embodiment.

The picture decoding apparatus 200 includes a memory information control unit 201, a short-term memory management unit 202, a long-term memory management unit 203, a management information decoding unit 205, a storage area designation unit 207, a reference area designation unit 208, a picture memory 209, a picture decoding unit 210, a variable length decoding unit 212 and others.

The memory information control unit 201 judges based on the picture type information PT whether or not a current picture to be decoded can refer to either a forward or a backward picture or both the forward and backward pictures. The memory information control unit 201 further instructs the reference area designation unit 208 to output the reference picture(s) that corresponds to the judgment result from the picture memory 209 to the picture decoding unit 210.

The variable length decoding unit 212 performs variable length decoding on the coded picture stream VSt. The picture decoding unit 210 further decodes the output from the variable length decoding unit 212 to output the decoded picture signal Vout, and stores the output into the picture memory 209 as a reference picture.

At this time, the memory area of the picture memory 209 where the reference picture can be stored is determined according to the instruction from the storage area designation unit 207. More specifically, the memory information control unit 201 inquires the short-term memory management unit 202 so as to designate the memory area of the short-term memory in the picture memory 209 from which the picture is removed. The storage area designation unit 207 instructs the picture memory 209 to record the reference picture in the designated memory area.

The editing detection unit 215 detects the editing point on the coded picture stream VSt based on the output from the variable length decoding unit 212, and outputs the information indicating the editing point to the memory information control unit 201.

The management information decoding unit 205 decodes the memory management information stream CSt, and notifies the short-term memory management unit 202, through the memory information control unit 201, of the memory management command that instructs removal of an unnecessary picture (which is not referred to) in the short-term memory. The management information decoding unit 205 further notifies the long-term memory management unit 203 of the memory management command that instructs moving of the picture stored in the short-term memory to the long-term memory in the picture memory 209.

Here, if the picture to be managed under the retransmitted memory management command is earlier than the IDR picture in decoding order, the memory information control unit 201 disables the memory management command. If the picture to be managed under the memory management command is earlier than the editing point in decoding order, the memory information control unit 201 disables the memory management command. And the memory information control unit 201 regards the immediately previously decoded picture as a picture to be managed, among the pictures assigned the picture number same as the number indicated by the memory management command, and applies the management indicated by the memory management command to that picture to be managed.

The features of the picture decoding apparatus in the present embodiment as described above will be explained using FIG. 2B used in the first embodiment.

For example, in the case where the decoded memory management command is the retransmitted one and instructs release of the memory area (so as to make it reusable) where the picture (C1, for example) which has been decoded earlier than the IDR picture (C4) is stored, the picture decoding apparatus 200 disables this memory management command. In other words, the picture decoding apparatus 200 does not execute the management of the picture C1 instructed by this memory management command.

The IDR picture initializes the pictures stored in the memory at this time of decoding of that IDR picture. Therefore, in the case where the picture to be managed under the retransmitted memory management command is earlier than the IDR picture, there has been no such picture to be managed under the memory management command in the memory of the picture decoding apparatus at the point in time when the retransmitted memory management command is executed. In such a situation, a malfunction may occur in the picture decoding apparatus, such as newly generating the picture which has been lost and storing it into the memory by regarding the situation as an error, and as a result, losing another picture in the memory.

Against the backdrop, even if the memory management command for the picture which has been decoded earlier than the IDR picture is retransmitted, the picture decoding apparatus 200 in the present embodiment does not execute the management indicated by the memory management command by regarding the retransmission of the memory management command as an error. Therefore, it becomes possible to prevent the above-mentioned malfunction.

Since the picture coding apparatus 100 in the first embodiment generates a coded picture stream so that above-mentioned memory management command is not retransmitted, even the conventional picture decoding apparatus can decode this coded picture stream without causing the above malfunction. However, the conventional picture decoding apparatus fails to function normally as mentioned above when decoding the coded picture stream generated by the conventional picture coding apparatus. On the other hand, the picture decoding apparatus in the present embodiment can decode even the coded picture stream generated by the conventional picture coding apparatus without causing the malfunction.

Other features of the present embodiment will be explained.

The picture decoding apparatus 200 in the present embodiment applies the retransmitted memory management command to the immediately previously decoded picture among the pictures assigned the picture number same as the picture number of the picture to be managed under the memory management command. This operation of the picture decoding apparatus has to be coincided with the operation of the picture coding apparatus. Therefore, even in the case where the picture coding apparatus 100 in the first embodiment prohibits the retransmission of the memory management command for another picture than the immediately previous picture to be managed so as to generate the coded picture stream, the operations in the present embodiment have to be executed.

The features of the above-mentioned picture decoding apparatus 200 in the present embodiment will be described using FIG. 2A used in the first embodiment.

In the case where the decoded memory management command has been retransmitted and instructs release of the memory area where the picture of the picture number 2 is stored, the picture decoding apparatus 200 releases the memory area where the picture C2, which is closest to the current time in decoding order, is stored, and does not release the memory where the picture B2 is stored.

Therefore, when decoding the memory management command that indicates to release the memory area where the picture of the picture number 2 is stored, the picture decoding apparatus 200 in the present embodiment easily determines which one of the memory areas, where the picture B2 and the picture C2 which are assigned the same picture number 2 are respectively stored, should be released. More specifically, the picture decoding apparatus 200 can identify the memory area where the picture C2, which has been decoded at the time closest to the current picture A to be decoded, is stored, as a memory area to be released. Here, the picture C2 is the immediately previous picture in decoding order indicated by the retransmitted memory management command, among the pictures of the picture number 2.

If the picture to be managed under the retransmitted memory management command has been decoded earlier than the editing point, the picture decoding apparatus 200 in the present embodiment does not apply this memory management command to that picture.

This characteristic operation of the picture decoding apparatus 200 in the present embodiment will be explained using FIG. 3.

In the case where the decoded memory management command has been retransmitted and the picture stored in the memory to which the memory management command is to be applied has been decoded earlier than the editing point H, the picture decoding apparatus 200 does not execute the management indicated by that memory management command.

For example, in the case where the decoded memory management command is a retransmitted memory management command and indicates to release the memory area where the picture F1 which is earlier than the editing point H is stored, the picture decoding apparatus 200 does not execute the release of the memory area.

More specifically, since the coded picture stream including the picture F13 is now a coded picture stream Y after editing, the pictures F0 to F11 which are earlier than the editing point H are not stored in the memory. So, if the picture decoding apparatus executes the memory management command which is to be applied to the pictures F0 to F11 which are earlier than the editing point H, it may cause a malfunction of newly generating the lost pictures and storing them into the memory and deleting other pictures from the memory, because there exists no such picture to be managed in the memory when executing that memory management command for that picture. In addition, if there exists another picture assigned the same picture number as a picture to be managed in the memory when executing the memory management command, the memory management command is applied, as an error, to the picture to which the command should not be applied originally (which is not operated under the memory management command), and thus there is a possibility that the pictures subsequent to the editing point in the coded picture stream cannot be properly decoded. Therefore, the picture decoding apparatus 200 in the present embodiment does not execute the memory management command which is to be applied for management to the picture earlier than the editing point.

Here, the operation of the picture decoding apparatus 200 in the present embodiment will be explained.

Figure 9:
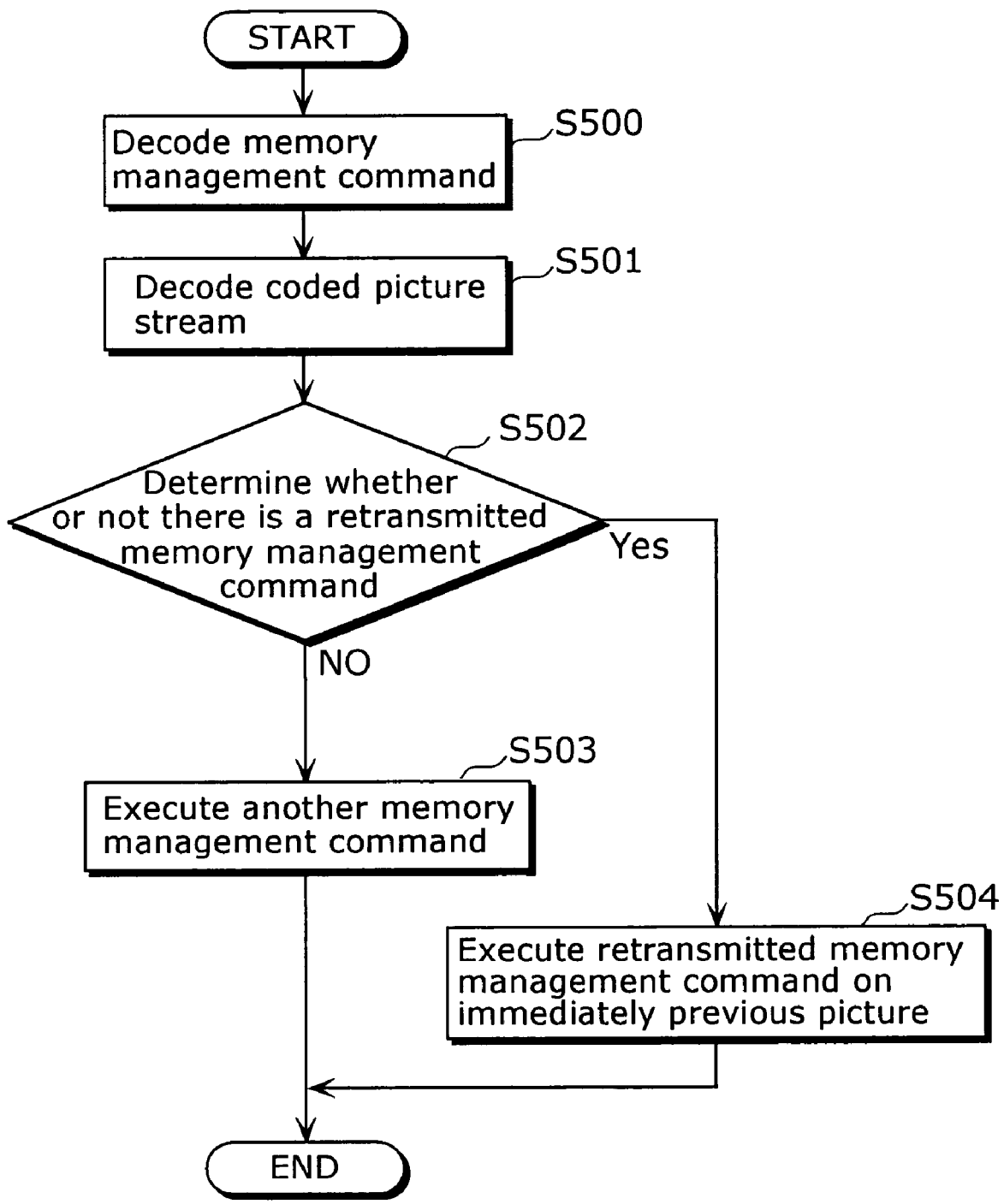
FIG. 9 is a flowchart showing the operation of the picture decoding apparatus in the second embodiment of the present invention for handling a memory management command based on a judgment about whether a picture is the immediately previous one or not.

FIG. 9 is a flowchart showing the operation of the picture decoding apparatus 200 in the present embodiment for handling a memory management command based on a judgment about whether a picture is the immediately previous one or not.

First, the management information decoding unit 205 in the picture decoding apparatus 200 decodes the memory management command included in the memory management information stream CSt (Step S500). In this step of decoding the memory management command (Step S500), the management information decoding unit 205 decodes both the retransmitted memory management command and the memory management command which has been received for the first time (which has not yet been retransmitted). Next, the variable length decoding unit 212 and the picture decoding unit 210 decode the coded picture stream VSt (Step S501).

Next, the memory information control unit 201 determines whether or not the decoded memory management commands include a retransmitted memory management command (for example, a memory management command that instructs release of an unnecessary memory) (Step S502). When determining that there is no retransmitted memory management command (No in Step S502), the memory information control unit 201 executes another non-retransmitted memory management command (Step S503). On the other hand, when determining that there is a retransmitted memory management command (Yes in Step S502), the memory information control unit 201 executes the retransmitted memory management command on the immediately previous picture in decoding order, among the pictures assigned the picture number same as the picture number indicated by that memory management command (Step S504). More specifically, the memory information control unit 201 executes the memory management command on the picture which is immediately previous to the memory management command, among the pictures assigned the same picture number and included in the coded picture stream VSt earlier than the memory management command in decoding order.

Figure 10:
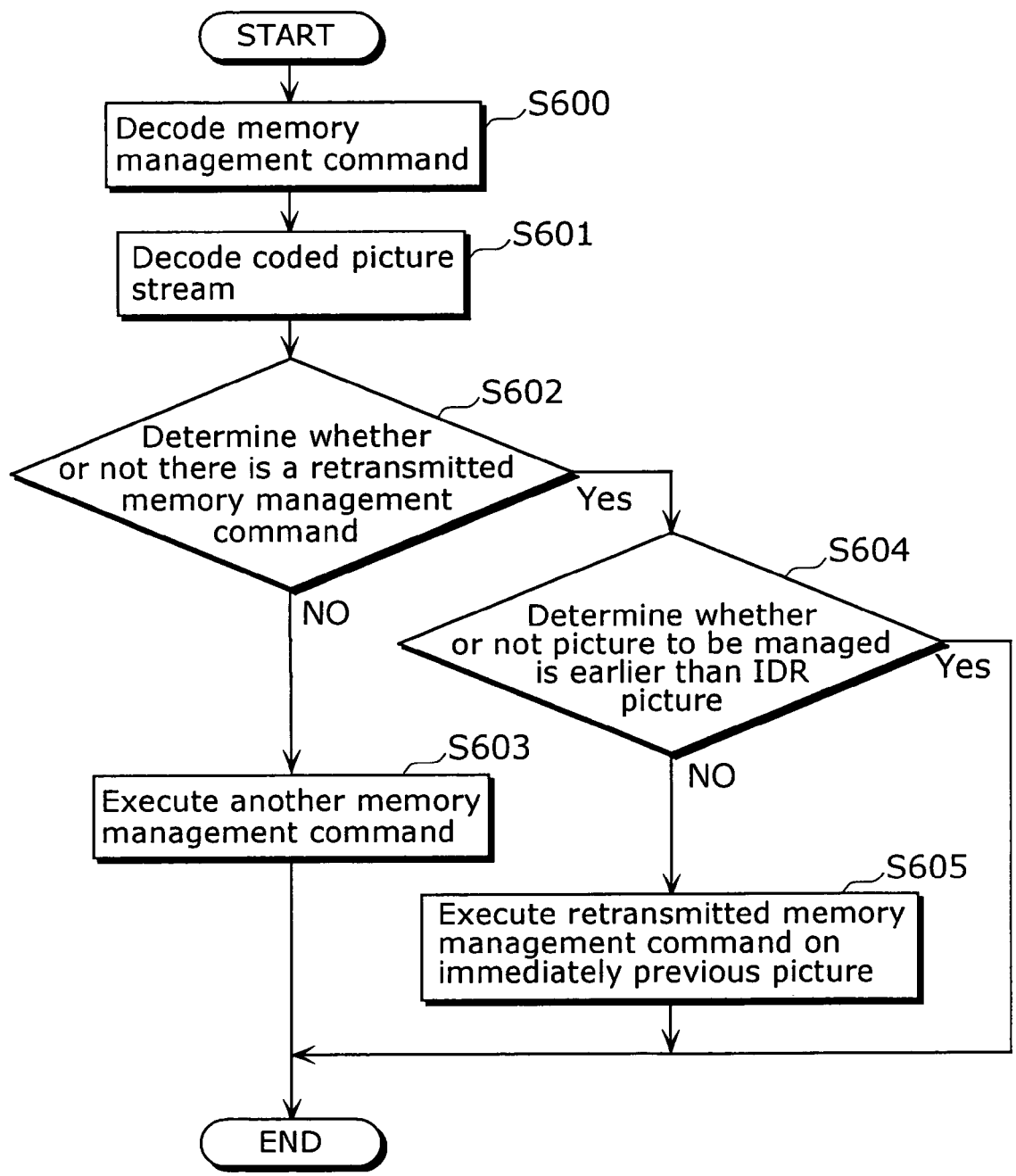
FIG. 10 is a flowchart showing the operation of the picture decoding apparatus in the second embodiment of the present invention for handling a memory management command based on an IDR picture and a judgment about whether a picture is the immediately previous one or not.

FIG. 10 is a flowchart showing the operation of the picture decoding apparatus 200 in the present embodiment for handling a memory management command based on an IDR picture and a judgment about whether a picture is the immediately previous one or not.

The picture decoding apparatus 200 executes the same operations (Steps S600 to S603) as Steps S500 to S503 as shown in FIG. 9.

When determining in Step S602 that there is a retransmitted memory management command (Yes in Step S602), the memory information control unit 201 in the picture decoding apparatus 200 determines whether or not the picture to be managed under the retransmitted memory management command is a picture which has been decoded earlier than the IDR picture (Step S604). In the case where the retransmitted memory management command is a command that instructs release of an unnecessary memory area (so as to be reusable), for example, the picture to be managed under the retransmitted memory management command means a picture which is stored in the unnecessary memory area to be released.

Here, when determining that the picture to be managed is earlier than the IDR picture (Yes in Step S604), the memory information control unit 201 ends the processing without executing the retransmitted memory management command. On the other hand, when determining that the picture is not earlier than the IDR picture (No in Step S604), the memory information control unit 201 executes the memory management command on the immediately previous picture in decoding order, among the pictures assigned the picture number same as the picture number indicated by the retransmitted memory management command (Step S605), and ends the processing.

FIG. 11 is a flowchart showing the operation of the picture decoding apparatus 200 in the present embodiment for handling a memory management command based on an IDR picture, an editing point and a judgment about whether a picture is the immediately previous one or not.

The picture decoding apparatus 200 executes the operations (Steps S700 to S704) same as Steps S600 to S604 as shown in FIG. 10.

When determining in Step S704 that the picture to be managed under the retransmitted memory management command is not earlier than the IDR picture in decoding order (No in Step S704), the memory information control unit 201 in the picture decoding apparatus 200 further determines whether or not the picture to be managed is earlier than the editing point in decoding order (Step S705). More specifically, the memory information control unit 201 determines whether or not the picture to be managed is a picture which has been decoded earlier than the editing point.

Here, when determining that the picture to be managed is earlier than the editing point (Yes in Step S705), the memory information control unit 201 ends the processing without executing the retransmitted memory management command. On the other hand, when determining that the picture is not earlier than the editing point (No in Step S705), the memory information control unit 201 executes the memory management command on the immediately previous picture in decoding order, among the pictures assigned the picture number same as the picture number indicated by the retransmitted memory management command (Step S706), in the same manner as Step S504 as shown in FIG. 9, and ends the processing.

As described above, in the case where the picture to be managed under the retransmitted memory management command is earlier than the editing point or the IDR picture, the picture decoding apparatus 200 in the present embodiment does not apply (execute) the memory management command. Therefore, it becomes possible to prevent occurrence of a malfunction caused by no existence of the picture to be managed under the memory management command.

Since the picture decoding apparatus 200 in the present embodiment applies the memory management command to the picture immediately previous to the current picture to be decoded, among the pictures which are assigned the same picture number, it is possible to identify the picture to be managed without fail.

It should be noted that although the present embodiment is described by taking a memory management command that instructs release of an unnecessary memory as an example, it may be a memory management command that instructs moving of a picture stored in the short-term memory to the long-term memory if only it is a memory management command that indicates the management of the picture in the memory.

In addition, although, in the present embodiment, it is prohibited to apply a retransmitted memory management command when the picture to be managed under the memory management command is earlier than the IDR picture in coding order, the application thereof may be prohibited when the picture to be managed is earlier than the memory initialization command in coding order. This memory initialization command is a command that instructs initialization of a memory by deleting all the pictures stored in the memory and resetting of the picture number to 0.

Furthermore, although the flowchart in FIG. 11 is explained on the assumption that all the Steps S704, S705 and S706 are executed in this order, these steps may be executed in no particular order, namely, the execution order of the steps may be changed, or a part of the steps may be omitted for simple realization.

Third Embodiment

Next, the third embodiment of the present invention will be described.

In the present embodiment, if a program for realizing the picture coding method or the picture decoding method as shown in the first or second embodiment is recorded on a memory medium such as a flexible disk, it becomes possible to perform the processing as shown in the above embodiment easily in an independent computer system.

Figure 12A:
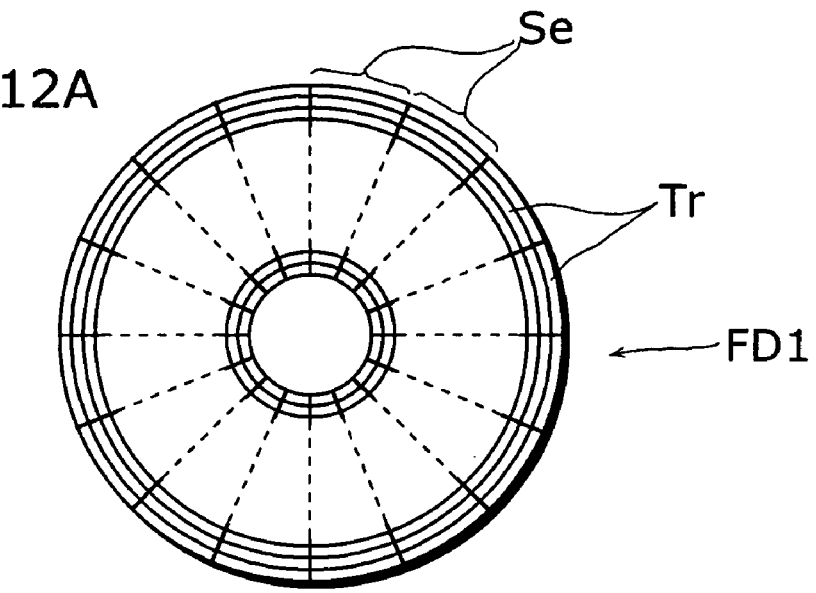
FIG. 12A, FIG. 12B and FIG. 12C are diagrams for explaining a storage medium in a third embodiment of the present invention.
Figure 12B:
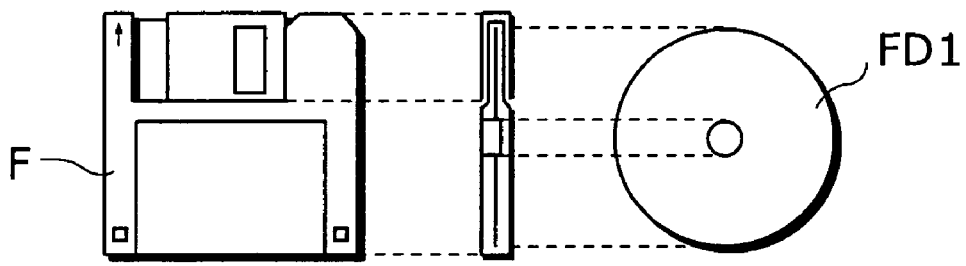
Figure 12C:
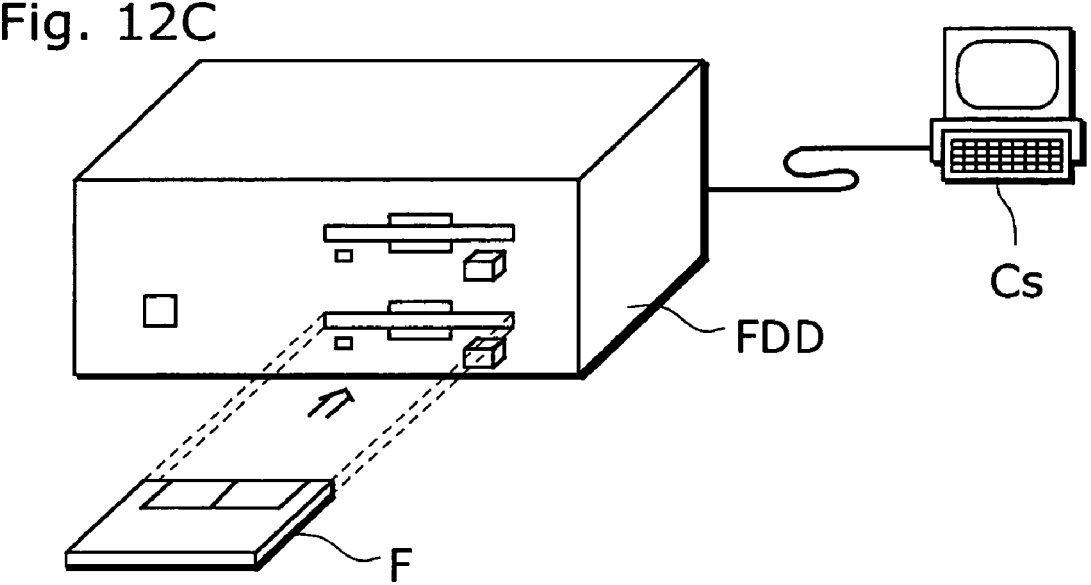

FIG. 12A to FIG. 12C are illustrations showing the case where the picture coding method or the picture decoding method in each of the above embodiments is performed in a computer system using a flexible disk on which the method is recorded.

FIG. 12B shows a front view of an appearance of a flexible disk, a cross-sectional view thereof and the flexible disk itself, and FIG. 12A shows an example of a physical format of the flexible disk as a recording medium body. The flexible disk FD 1 is contained in a case F, and a plurality of tracks Tr are formed concentrically on the surface of the disk in the radius direction from the periphery to the inside, and each track is divided into 16 sectors Se in the angular direction. Therefore, as for the flexible disk storing the above-mentioned program, the program as the picture coding method is recorded in an area allocated for it on the flexible disk FD.

FIG. 12C shows a structure for recording and reproducing the above program on and from the flexible disk FD1. When the program as the picture coding method or the picture decoding method is recorded on the flexible disk FD1, the program is written in the flexible disk from the computer system Cs via a flexible disk drive FDD. When the above picture coding method is constructed in the computer system by the program on the flexible disk FD1, the program is read out from the flexible disk FD1 using the flexible disk drive FDD and transferred to the computer system Cs.

The above explanation is made on the assumption that a recording medium is a flexible disk, but the same processing can also be performed using an optical disk. In addition, the recording medium is not limited to a flexible disk and an optical disk, but the same processing can be performed using any other medium such as an IC card and a ROM cassette capable of recording a program.

The picture coding method and the picture decoding method as shown in the above embodiments can be implemented, through a semiconductor like LSI, into a mobile communication device such as a mobile phone and a car navigation system and a picture-taking device such as a digital video camera and a digital still camera. Three types of implementations can be conceived: a sending/receiving terminal including both an encoder and a decoder; a sending terminal including an encoder only; and a receiving terminal including a decoder only.

Furthermore, applications of the picture coding method and the picture decoding method as shown in the above embodiments and systems using these methods will be explained.

Figure 13:
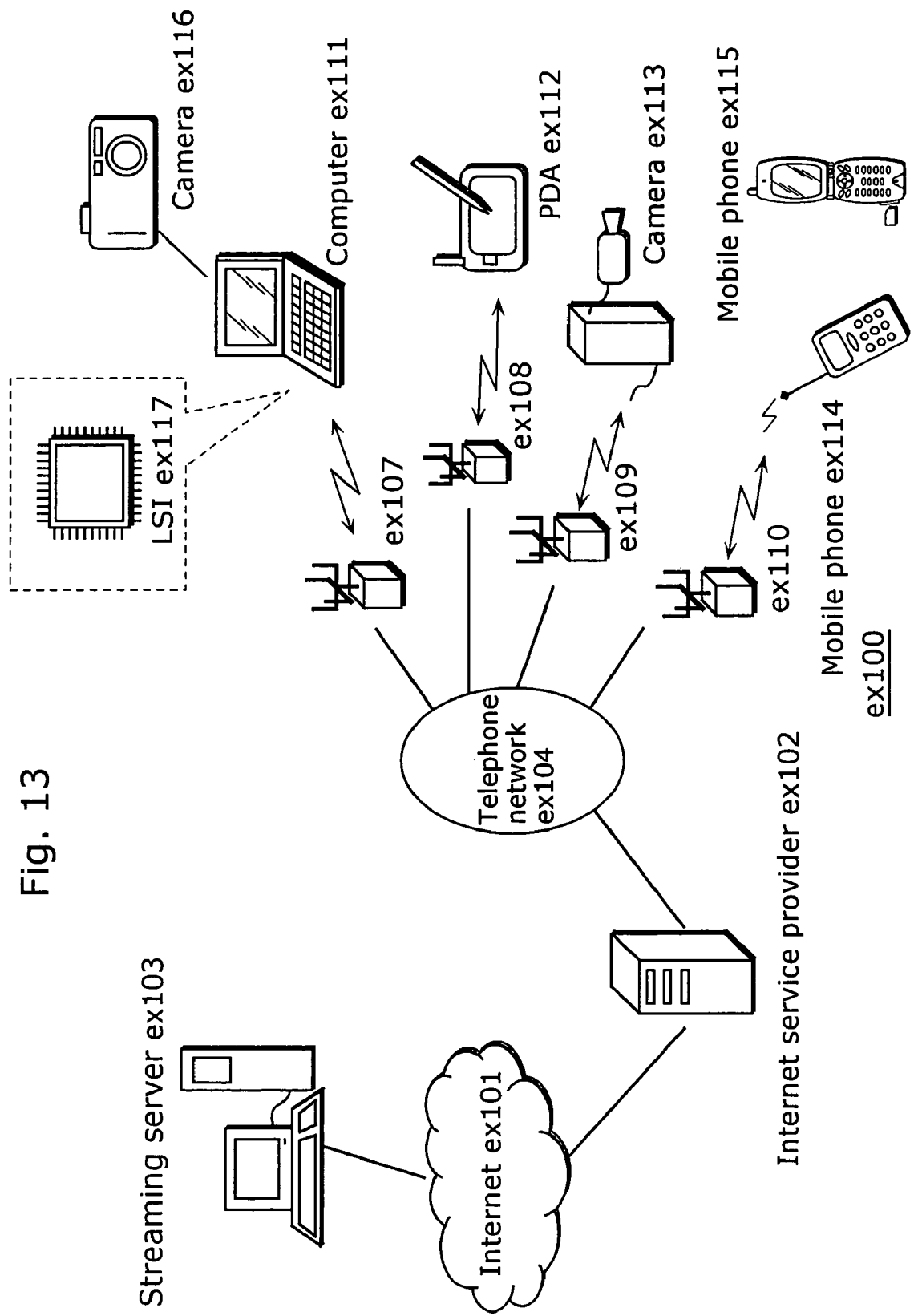
FIG. 13 is a block diagram showing an overall configuration of a content supply system in the third embodiment of the present invention.

FIG. 13 is a block diagram showing the overall configuration of a content supply system ex100 for realizing a content distribution service. The area for providing communication services is divided into cells of desired size, and base stations ex107~ex110 that are fixed wireless stations are placed in respective cells.

In this content supply system ex100, devices such as a computer ex111, a PDA (personal digital assistant) ex112, a camera ex113, a mobile phone ex114 and a camera-equipped mobile phone ex115 are connected to the Internet ex101 via an Internet service provider ex102, a telephone network ex104 and base stations ex107~ex110.

However, the content supply system ex100 is not limited to the configuration as shown in FIG. 13, and any of them may be combined and connected with each other. Also, each device may be connected directly to the telephone network ex104, not through the base stations ex107~ex110 that are fixed wireless stations.

The camera ex113 is a device such as a digital video camera capable of shooting moving pictures. The mobile phone may be a mobile phone of a PDC (Personal Digital Communications) system, a CDMA (Code Division Multiple Access) system, a W-CDMA (Wideband-Code Division Multiple Access) system or a GSM (Global System for Mobile Communications) system, a PHS (Personal Handyphone System) or the like, and any of them can be used.

A streaming server ex103 is connected to the camera ex113 via the base station ex109 and the telephone network ex104, which allows live distribution or the like using the camera ex113 based on the coded data transmitted from a user. Either the camera ex113 or the server or the like for transmitting the data may code the shot data. Also, the moving picture data shot by a camera ex116 may be transmitted to the streaming server ex103 via the computer ex111. The camera ex116 is a device such as a digital camera capable of shooting still and moving pictures. In this case, either the camera ex116 or the computer ex111 may code the moving picture data. An LSI ex117 included in the computer ex111 or the camera ex116 actually performs coding processing. Note that software for coding and decoding pictures may be integrated into any type of storage medium (such as a CD-ROM, a flexible disk and a hard disk) that is a recording medium which is readable by the computer ex111 or the like. Furthermore, the camera-equipped mobile phone ex115 may transmit the moving picture data. This moving picture data is the data coded by the LSI included in the mobile phone ex115.

The content supply system ex100 codes contents (such as a live music video) shot by users using the camera ex113, the camera ex116 or the like in the same manner as the above embodiment and transmits them to the streaming server ex103, while the streaming server ex103 makes stream distribution of the contents data to the clients at their request. The clients include the computer ex111, the PDA ex112, the camera ex113, the mobile phone ex114 and so on capable of decoding the above-mentioned coded data. In the content supply system ex100, the clients can thus receive and reproduce the coded data, and the clients can further receive, decode and reproduce the data in real time so as to realize personal broadcasting.

When each device in this system performs coding or decoding, the picture coding apparatus or the picture decoding apparatus, as shown in each of the above-mentioned embodiments, can be used.

A mobile phone will be explained as an example of the device.

Figure 14:
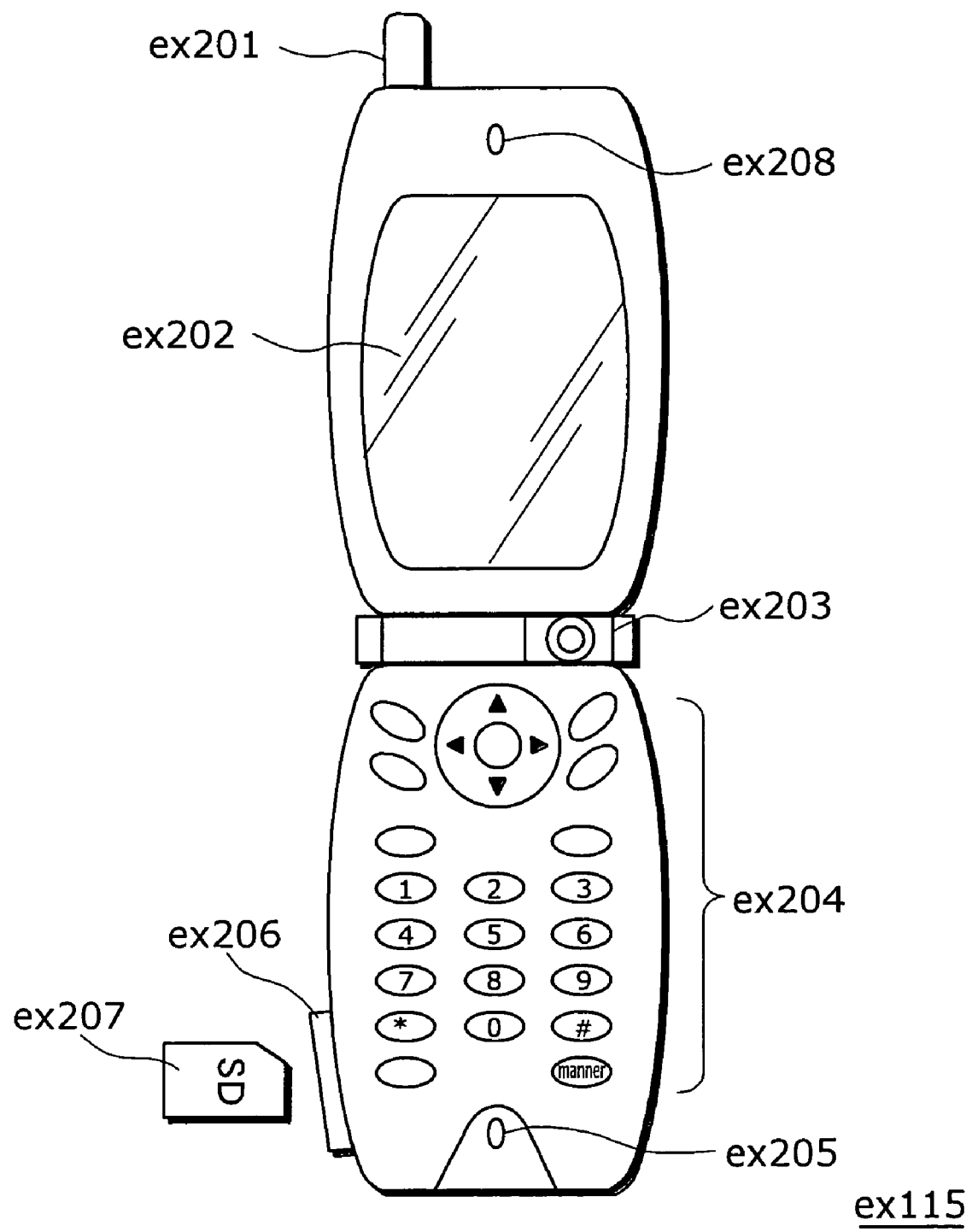
FIG. 14 is an external view showing an example of a mobile phone in the third embodiment of the present invention.

FIG. 14 is a diagram showing the mobile phone ex115 that uses the picture coding method and the picture decoding method explained in the above embodiments. The mobile phone ex115 has: an antenna ex201 for sending and receiving radio waves to and from the base station exam; a camera unit ex203 such as a CCD camera capable of shooting video and still pictures; a display unit ex202 such as a liquid crystal display for displaying the data obtained by decoding video and the like shot by the camera unit ex203 and received via the antenna ex201; a body unit including a set of operation keys ex204; a voice output unit ex208 such as a speaker for outputting voices; a voice input unit 205 such as a microphone for inputting voices; a storage medium ex207 for storing coded or decoded data such as data of shot moving or still pictures, data of received e-mails, data of moving or still pictures; and a slot unit ex206 for attaching the storage medium ex207 to the mobile phone ex115. The storage medium ex207 includes a flash memory element, a kind of EEPROM (Electrically Erasable and Programmable Read Only Memory) that is an electrically erasable and rewritable nonvolatile memory, in a plastic case such as an SD card.

The mobile phone ex115 will be further explained with reference to FIG. 15. In the mobile phone ex115, a main control unit ex311 for overall controlling the display unit ex202 and the body unit including operation keys ex204 is connected to a power supply circuit unit ex310, an operation input control unit ex304, a picture coding unit ex312, a camera interface unit ex303, an LCD (Liquid Crystal Display) control unit ex302, a picture decoding unit ex309, a multiplex/demultiplex unit ex308, a record/reproduce unit ex307, a modem circuit unit ex306 and a voice processing unit ex305, and these units are connected to each other via a synchronous bus ex313.

When a call-end key or a power key is turned ON by a user's operation, the power supply circuit unit ex310 supplies respective units with power from a battery pack, so as to activate the camera-equipped digital mobile phone ex115 for making it into a ready state.

In the mobile phone ex115, the voice processing unit ex305 converts the voice signals received by the voice input unit ex205 in voice conversation mode into digital voice data under the control of the main control unit ex311 including a CPU, ROM and RAM or the like, the modem circuit unit ex306 performs spread spectrum processing of the digital voice data, and the send/receive circuit unit ex301 performs digital-to-analog conversion and frequency transform of the data, so as to transmit it via the antenna ex201. Also, in the mobile phone ex115, after the data received by the antenna ex201 in voice conversation mode is amplified and performed of frequency transform and analog-to-digital conversion, the modem circuit unit ex306 performs inverse spread spectrum processing of the data, and the voice processing unit ex305 converts it into analog voice data, so as to output it via the voice output unit 208.

Furthermore, when transmitting e-mail in data communication mode, the text data of the e-mail inputted by operating the operation keys ex204 on the body unit is sent out to the main control unit ex311 via the operation input control unit ex304. After the modem circuit unit ex306 performs spread spectrum processing of the text data and the send/receive circuit unit ex301 performs digital-to-analog conversion and frequency transform for it, the main control unit ex311 transmits the resulting data to the base station ex110 via the antenna ex201.

When picture data is transmitted in data communication mode, the picture data shot by the camera unit ex203 is supplied to the picture coding unit ex312 via the camera interface unit ex303. When the picture data is not transmitted, it is also possible to display the picture data shot by the camera unit ex203 directly on the display unit 202 via the camera interface unit ex303 and the LCD control unit ex302.

The picture coding unit ex312, which includes the picture coding apparatus as explained in the present invention, compresses and codes the picture data supplied from the camera unit ex203 by the coding method used for the moving picture coding apparatus as shown in the above embodiments so as to transform it into coded picture data, and sends it out to the multiplex/demultiplex unit ex308. At this time, the mobile phone ex115 sends out, to the multiplex/demultiplex unit ex308 via the voice processing unit ex305, the voices received by the voice input unit ex205 during shooting by the camera unit ex203, as digital voice data.

The multiplex/demultiplex unit ex308 multiplexes the coded picture data supplied from the picture coding unit ex312 and the voice data supplied from the voice processing unit ex305 by a predetermined method, the modem circuit unit ex306 performs spread spectrum processing of the multiplexed data obtained as a result of the multiplexing, and the send/receive circuit unit ex301 performs digital-to-analog conversion and frequency transform on the data for transmission via the antenna ex201.

As for receiving data of a moving picture file which is linked to a Web page or the like in data communication mode, the modem circuit unit ex306 performs inverse spread spectrum processing on the data received from the base station ex110 via the antenna ex201, and sends out the multiplexed data obtained as a result of the processing to the multiplex/demultiplex unit ex308.

In order to decode the multiplexed data received via the antenna ex201, the multiplex/demultiplex unit ex308 separates the multiplexed data into a bit stream of picture data and a bit stream of voice data, and supplies the coded picture data to the picture decoding unit ex309 and the voice data to the voice processing unit ex305 respectively via the synchronous bus ex313.

Next, the picture decoding unit ex309, which includes the picture decoding apparatus as explained in the present invention, decodes the bit stream of picture data by the decoding method corresponding to the coding method as shown in the above-mentioned embodiment to generate reproduced moving picture data, and supplies this data to the display unit ex202 via the LCD control unit ex302, and thus moving picture data included in a moving picture file linked to a Web page, for instance, is displayed. At the same time, the voice processing unit ex305 converts the voice data into analog voice data, and supplies this data to the voice output unit ex208, and thus voice data included in a moving picture file linked to a Web page, for instance, is reproduced.

Figure 16:
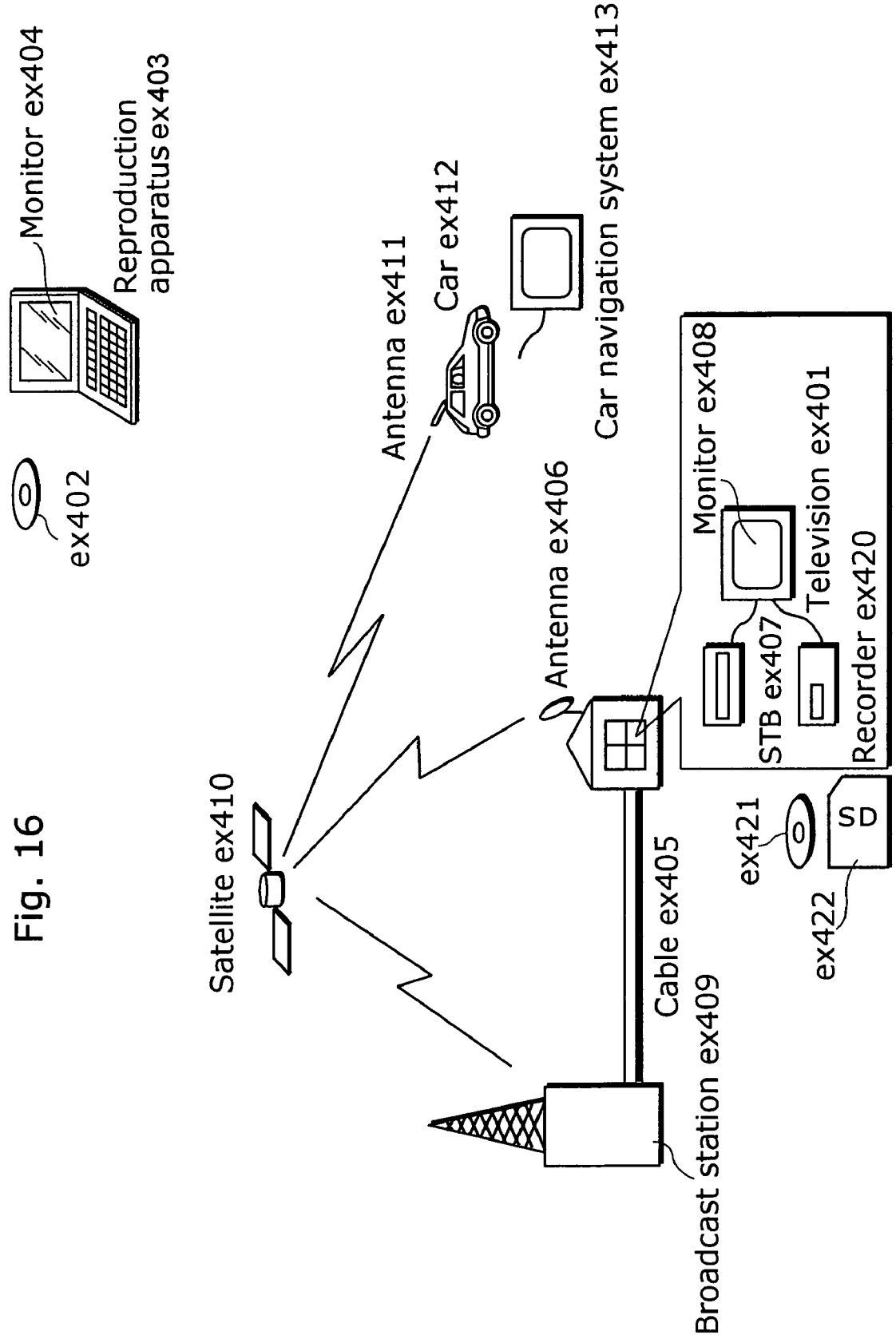
FIG. 16 is a configuration diagram showing a configuration of a digital broadcasting system in the third embodiment of the present embodiment.

The present invention is not limited to the above-mentioned system, and at least either the picture coding apparatus or the picture decoding apparatus in each of the above-mentioned embodiments can be incorporated into a system for digital broadcasting as shown in FIG. 16. Such ground-based or satellite digital broadcasting has been in the news lately. More specifically, a bit stream of video information is transmitted from a broadcast station ex409 to a communication or broadcast satellite ex410 via radio waves. Upon receipt of it, the broadcast satellite ex410 transmits radio waves for broadcasting, a home-use antenna ex406 with a satellite broadcast reception setup receives the radio waves, and a device such as a television (receiver) ex401 or a set top box (STB) ex407 decodes the bit stream for reproduction. The picture decoding apparatus as shown in the above-mentioned embodiment can be implemented in the reproduction apparatus ex403 for reading off and decoding the bit stream recorded on a storage medium ex402 that is a recording medium such as a CD and DVD. In this case, the reproduced video signals are displayed on a monitor ex404. It is also conceived to implement the picture decoding apparatus into the set top box ex407 connected to a cable ex405 for a cable television or the antenna ex406 for satellite and/or ground-based broadcasting so as to reproduce them on a monitor ex408 of the television. The picture decoding apparatus may be incorporated into the television, not into the set top box. Or, a car ex412 having an antenna ex411 can receive signals from the satellite ex410, the base station ex107 or the like for reproducing moving pictures on a display device such as a car navigation system ex413 in the car ex412.

Furthermore, the picture coding apparatus as shown in the above-mentioned embodiments can code picture signals for recording them on a recording medium. As a concrete example, there is a recorder ex420 such as a DVD recorder for recording picture signals on a DVD disc ex421 and a disk recorder for recording them on a hard disk. They can also be recorded on an SD card ex422. If the recorder ex420 includes the picture decoding apparatus as shown in the above-mentioned embodiments, the picture signals recorded on the DVD disc ex421 or the SD card ex422 can be reproduced for display on the monitor ex408.

Figure 15:
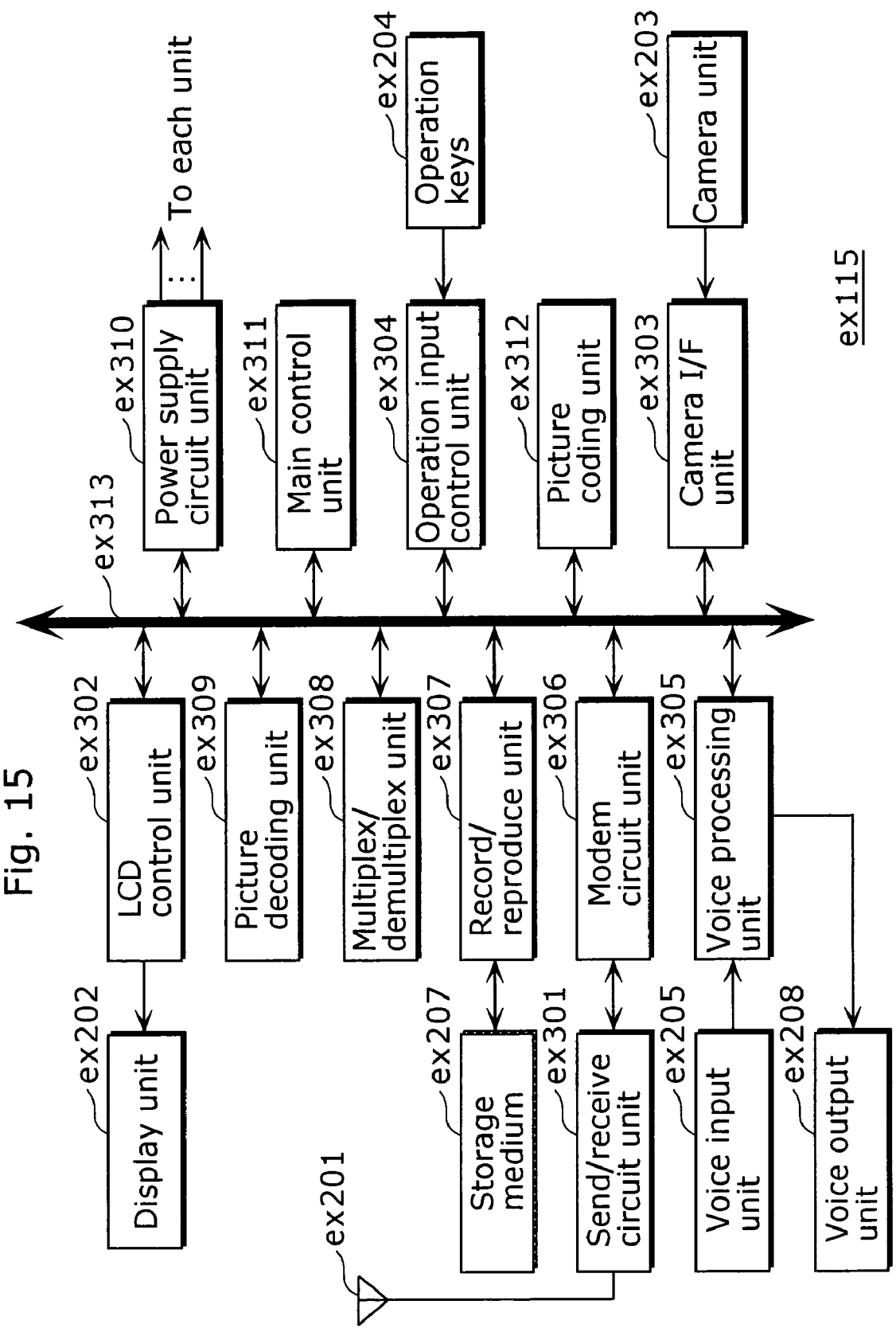
FIG. 15 is a block diagram showing a configuration of the mobile phone in the third embodiment of the present invention.

As the structure of the car navigation system ex413, the structure without the camera unit ex203, the camera interface unit ex303 and the picture coding unit ex312, out of the units shown in FIG. 15, can be conceived. The same applies to the computer ex111, the television (receiver) ex401 and others.

In addition, three types of implementations can be conceived for a terminal such as the above-mentioned mobile phone ex114; a sending/receiving terminal including both an encoder and a decoder, a sending terminal including an encoder only, and a receiving terminal including a decoder only.

As described above, it is possible to use the picture coding method or the picture decoding method as shown in each of the above-mentioned embodiments in any of the above-mentioned apparatuses and systems, and using this method, the effects described in the above embodiments can be obtained.

The present invention is not limited to the above-mentioned embodiments, and various changes and modifications may be made without departing from the spirit and scope of the invention.

INDUSTRIAL APPLICABILITY

The picture coding method and the picture decoding method according to the present invention can prevent occurrence of a malfunction caused by retransmission of a command, and can be applied to a picture coding apparatus such as a video camera and a mobile phone with a recording function for coding pictures by the present picture coding method and a picture decoding apparatus such as a personal computer and a mobile phone for decoding coded signals by the present picture decoding method.

The invention claimed is:

1. A picture coding method for coding a moving picture having a plurality of pictures, on a picture-by-picture basis, using a set of picture numbers repeatedly assigned in coding order to respective pictures included in the moving picture such that more than one of the pictures included in the moving picture has the same picture number, the picture coding method comprising:
   a first adding step of adding, using a first adding unit, a first memory management command to a first picture having a predetermined picture number, the first memory management command being information for managing the first picture;
   a determining step of determining, using a determining unit, whether or not the first picture, from among a plurality of pictures each having the predetermined picture number, is located immediately previous to a second picture in coding order, the second picture being different from the first picture;
   a second adding step of adding, using a second adding unit, a second memory management command to a point of the second picture, the second memory management command being the same as the first memory management command, when a determination is made in the determining step that the first picture is located immediately previous to the second picture in coding order; and
   a prohibiting step of prohibiting, using a prohibiting unit, the addition of the second memory management command when a determination is made in the determining step that the first picture is not located immediately previous to the second picture in coding order.

2. A picture coding apparatus that codes a moving picture having a plurality of pictures, on a picture-by-picture basis, using a set of picture numbers repeatedly assigned in coding order to respective pictures included in the moving picture such that more than one of the pictures included in the moving picture has the same picture number, the picture coding apparatus comprising:
   a first adding unit operable to add a first memory management command to a first picture having a predetermined picture number, the first memory management command being information for managing the first picture;
   a determining unit operable to determine whether or not the first picture, from among a plurality of pictures each having the predetermined picture number, is located immediately previous to a second picture in coding order, the second picture being different from the first picture;
   a second adding unit operable to add a second memory management command to a point of the second picture, the second memory management command being the same as the first memory management command, when a determination is made by the determining unit that the first picture is located immediately previous to the second picture in coding order; and
   a prohibiting unit operable to prohibit the addition of the second memory management command when a determination is made by the determining unit that the first picture is not located immediately previous to the second picture in coding order.

3. A picture coding method for generating a coded picture stream of a moving picture by coding a moving picture having a plurality of pictures, on a picture-by-picture basis, using a set of picture numbers repeatedly assigned in coding order to respective pictures included in the moving picture such that more than one of the pictures included in the moving picture has the same picture number, the picture coding method comprising:
   a first adding step of adding, using a first adding unit, a first memory management command to a first picture having a predetermined picture number, the first memory management command being information for managing the first picture;
   a determining step of determining, using a determining unit, whether or not the first picture, from among a plurality of pictures each having the predetermined picture number, is located immediately previous to a second memory management command in coding order;
   a second adding step of adding, using a second adding unit, the second memory management command to the coded picture stream of the moving picture, the second memory management command being the same as the first memory management command, when a determination is made in the determining step that the first picture is located immediately previous to the second memory management command in cording order; and
   a prohibiting step of prohibiting, using a prohibiting unit, the addition of the second memory management command when a determination is made in the determining step that the first picture is not located immediately previous to the second memory management command in coding order.

* * * * *